United States Patent
Tu et al.

(10) Patent No.: US 12,494,195 B2
(45) Date of Patent: Dec. 9, 2025

(54) SPEECH RECOGNITION METHOD, APPARATUS, ELECTRONIC DEVICE AND COMPUTER READABLE STORAGE MEDIUM

(71) Applicant: SAMSUNG ELECTRONICS CO., LTD., Suwon-si (KR)

(72) Inventors: Mei Tu, Beijing (CN); Fan Zhang, Beijing (CN); Wangli Chao, Beijing (CN); Xiaoyun Xu, Beijing (CN); Song Liu, Beijing (CN); Shuo Hu, Beijing (CN); Xue Wen, Beijing (CN); Liming Song, Beijing (CN); Xiaoyan Lou, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 550 days.

(21) Appl. No.: 17/592,956

(22) Filed: Feb. 4, 2022

(65) Prior Publication Data
US 2022/0310077 A1   Sep. 29, 2022

Related U.S. Application Data

(63) Continuation of application No. PCT/KR2021/020378, filed on Dec. 31, 2021.

(30) Foreign Application Priority Data

Mar. 25, 2021  (CN) .......................... 202110322406.1
Jun. 30, 2021  (CN) .......................... 202110736466.8

(51) Int. Cl.
G10L 15/187      (2013.01)
G10L 15/00       (2013.01)
(Continued)

(52) U.S. Cl.
CPC .......... *G10L 15/187* (2013.01); *G10L 15/005* (2013.01); *G10L 15/02* (2013.01); *G10L 15/22* (2013.01); *G10L 2015/025* (2013.01)

(58) Field of Classification Search
CPC ..... G10L 15/187; G10L 15/005; G10L 15/02; G10L 15/22; G10L 2015/025;
(Continued)

(56) References Cited

U.S. PATENT DOCUMENTS 5,946,410 A * 8/1999 Lyon ................... G06V 30/244
                                                        382/157
6,513,005 B1 * 1/2003 Qin ....................... G06F 18/256
                                                        704/E15.04
(Continued)

FOREIGN PATENT DOCUMENTS

CN    111950293 A  * 11/2020  ............. G06F 40/30
CN    113569561 A  * 10/2021  ........... G06F 40/232
(Continued)

OTHER PUBLICATIONS

Supplementary European Search Report dated Mar. 15, 2024, issued by the European Patent Office in European Application No. 21933394.5.
(Continued)

*Primary Examiner* — Thuykhanh Le
(74) *Attorney, Agent, or Firm* — Sughrue Mion, PLLC

(57) ABSTRACT

A speech recognition method, an apparatus, an electronic device, and a computer-readable storage medium are provided. The method includes acquiring a first speech recognition result of a speech; acquiring context information and pronunciation feature information about a target text unit in the first speech recognition result; and acquiring a second speech recognition result of the speech based on the context information and the pronunciation feature information.

18 Claims, 25 Drawing Sheets

(51) Int. Cl.
*G10L 15/02* (2006.01)
*G10L 15/22* (2006.01)

(58) Field of Classification Search
CPC ... G10L 15/16; G10L 15/18; G10L 2015/081; G10L 15/32
USPC ...................................................... 704/254
See application file for complete search history.

(56) References Cited

U.S. PATENT DOCUMENTS

| | | | |
|---|---|---|---|
| 7,742,919 B1* | 6/2010 | Davis ..................... | G10L 13/06 704/260 |
| 8,965,763 B1 | 2/2015 | Chelba et al. | |
| 9,275,635 B1* | 3/2016 | Beaufays ................ | G10L 15/32 |
| 9,311,915 B2* | 4/2016 | Weinstein ............... | G10L 15/16 |
| 9,741,339 B2* | 8/2017 | Peng ....................... | G10L 13/08 |
| 9,898,187 B2* | 2/2018 | Xia ......................... | G06V 30/36 |
| 10,210,862 B1* | 2/2019 | Ladhak .................. | G06N 3/084 |
| 10,255,346 B2 | 4/2019 | Horesh et al. | |
| 10,332,508 B1* | 6/2019 | Hoffmeister ............ | G06N 3/08 |
| 10,388,274 B1* | 8/2019 | Hoffmeister ........... | G06N 3/044 |
| 10,395,640 B1* | 8/2019 | Beach ..................... | G10L 15/26 |
| 10,580,400 B2* | 3/2020 | Jeong ..................... | G10L 15/005 |
| 11,393,597 B1* | 7/2022 | Gandhi ................... | G06K 7/1482 |
| 11,881,205 B2* | 1/2024 | Wu ......................... | G10L 13/086 |
| 11,893,977 B2* | 2/2024 | Wang ...................... | G10L 15/005 |
| 2003/0229497 A1* | 12/2003 | Wilson ................... | G09B 19/04 704/270.1 |
| 2004/0088163 A1* | 5/2004 | Schalkwyk ............ | G10L 15/187 704/E15.02 |
| 2005/0033575 A1* | 2/2005 | Schneider .............. | G10L 15/142 704/254 |
| 2005/0143970 A1* | 6/2005 | Roth ....................... | G10L 15/187 704/4 |
| 2006/0149558 A1* | 7/2006 | Kahn ...................... | G10L 15/063 704/278 |
| 2006/0259294 A1* | 11/2006 | Tashereau ............... | G10L 15/02 704/E15.044 |
| 2007/0219797 A1* | 9/2007 | Liu ......................... | G10L 15/08 704/E15.014 |
| 2008/0221890 A1* | 9/2008 | Kurata ................... | G10L 15/063 704/E15.005 |
| 2010/0131262 A1* | 5/2010 | Gruhn .................... | G10L 15/187 704/E15.001 |
| 2010/0185446 A1* | 7/2010 | Homma ................. | G09B 29/106 704/E15.005 |
| 2013/0138439 A1* | 5/2013 | Marcus ................... | G10L 15/22 704/E15.001 |
| 2013/0204626 A1* | 8/2013 | Marcus ................... | G10L 15/22 704/270.1 |
| 2013/0275135 A1* | 10/2013 | Morales ................. | G10L 15/22 704/236 |
| 2014/0039887 A1 | 2/2014 | Dzik et al. | |
| 2014/0379349 A1 | 12/2014 | Bangalore et al. | |
| 2015/0019225 A1* | 1/2015 | Sims, III ................ | G10L 15/32 704/254 |
| 2015/0170648 A1* | 6/2015 | King ....................... | G06F 3/0485 704/235 |
| 2015/0340035 A1* | 11/2015 | Serban ................... | G10L 15/14 704/257 |
| 2016/0155436 A1 | 6/2016 | Choi et al. | |
| 2016/0180835 A1* | 6/2016 | Nissan ................... | G10L 15/063 704/10 |
| 2017/0011735 A1* | 1/2017 | Kim ....................... | G10L 15/005 |
| 2017/0047060 A1* | 2/2017 | Liu ......................... | G10L 13/10 |
| 2017/0358297 A1* | 12/2017 | Scheiner ............... | G06F 40/289 |
| 2018/0033428 A1* | 2/2018 | Kim ....................... | G10L 21/0208 |
| 2018/0144747 A1* | 5/2018 | Skarbovsky .......... | G06F 40/109 |
| 2018/0174589 A1 | 6/2018 | Choi et al. | |
| 2018/0315420 A1* | 11/2018 | Ash ........................ | G10L 15/193 |
| 2018/0330730 A1* | 11/2018 | Garg ..................... | G10L 15/1815 |
| 2018/0350366 A1* | 12/2018 | Park ....................... | G10L 15/22 |
| 2019/0189111 A1* | 6/2019 | Watanabe ............... | G10L 15/16 |
| 2019/0206400 A1* | 7/2019 | Cui ........................ | B25J 9/1697 |
| 2020/0020327 A1 | 1/2020 | Chae et al. | |
| 2020/0027445 A1* | 1/2020 | Raghunathan .......... | G10L 15/32 |
| 2020/0082808 A1 | 3/2020 | Li et al. | |
| 2020/0160836 A1* | 5/2020 | Chen ...................... | G10L 15/005 |
| 2020/0160866 A1* | 5/2020 | Szymanski .............. | G06N 3/02 |
| 2020/0175968 A1* | 6/2020 | Donati ................... | G10L 15/187 |
| 2020/0184978 A1* | 6/2020 | Lu ........................... | G10L 15/10 |
| 2020/0193977 A1* | 6/2020 | Ramabhadran ......... | G10L 15/19 |
| 2020/0286486 A1* | 9/2020 | Song ...................... | G10L 15/26 |
| 2020/0320985 A1* | 10/2020 | Kumar ................... | G10L 15/02 |
| 2020/0380215 A1* | 12/2020 | Kannan ................. | G10L 15/005 |
| 2021/0074277 A1* | 3/2021 | Lewis .................... | G10L 15/22 |
| 2021/0099587 A1* | 4/2021 | Minami ............. | H04N 1/00403 |
| 2021/0209304 A1* | 7/2021 | Yang ..................... | G06F 40/295 |
| 2021/0225389 A1* | 7/2021 | Proença .................. | G10L 17/24 |
| 2021/0303263 A1* | 9/2021 | Kim ..................... | B60R 16/0231 |
| 2022/0068261 A1* | 3/2022 | Sharifi .................... | G06F 3/16 |
| 2022/0084523 A1* | 3/2022 | Matula .................... | G10L 15/26 |
| 2022/0101835 A1* | 3/2022 | Freed .................... | G10L 15/065 |
| 2022/0103683 A1* | 3/2022 | Engelke ............ | H04M 3/42391 |
| 2022/0130374 A1* | 4/2022 | Chen ..................... | G10L 15/005 |
| 2022/0132218 A1* | 4/2022 | Aher ................... | H04N 21/4667 |
| 2022/0246142 A1* | 8/2022 | Sekine ................ | G10L 15/1815 |
| 2022/0269252 A1* | 8/2022 | Miyaura ................. | G06N 3/08 |
| 2022/0300719 A1* | 9/2022 | Raina .................... | G10L 25/24 |
| 2022/0319511 A1* | 10/2022 | Lee ......................... | G10L 15/07 |
| 2023/0055233 A1* | 2/2023 | Ji .......................... | G10L 15/187 |
| 2023/0065965 A1* | 3/2023 | Liu ....................... | G06F 40/284 |
| 2023/0132072 A1* | 4/2023 | Tunstall-Pedoe ..... | G06F 40/242 704/9 |

FOREIGN PATENT DOCUMENTS

| | | |
|---|---|---|
| JP | 2014-77882 A | 5/2014 |
| KR | 10-2010-0136192 A | 12/2010 |
| KR | 101590724 B1 | 2/2016 |

OTHER PUBLICATIONS

Extended European Search Report dated Jun. 5, 2024, issued by the European Patent Office in European Application No. 21933394.5.
Wang et al., "ASR Error Correction with Augmented Transformer for Entity Retrieval", 2020, Interspeech, Amazon, 5 pages total.
Esteve et al., "Recent improvements on error detection for automatic speech recognition", 2016, 5 pages total.
International Search Report (PCT/ISA/210) and Written Opinion (PCT/ISA/237) dated Apr. 15, 2022 issued by the International Searching Authority in International Application No. PCT/KRKR2021/020378.
Chen et al., "Integrated Semantic and Phonetic Post-correction for Chinese Speech Recognition", ArXiv, Nov. 16, 2021, 7 total pages, XP091100225, arXiv:2111.08400v1.
Office Action dated May 26, 2025, issued by European Patent Office in European Patent Application No. 21933394.5.

* cited by examiner word form sequence $X_T$: "how step"

phoneme sequence $I_x$: HH AW S T EH P feature cluster    HH OW S D AH P         S314
                   HH AW Z T AH P
                   HH AW S T AH P   "housetop"
                   HH AW S T EH P
                   ... ...    ⇩ feature matrix transformation feature cluster vector

SPEECH RECOGNITION METHOD, APPARATUS, ELECTRONIC DEVICE AND COMPUTER READABLE STORAGE MEDIUM

CROSS-REFERENCE TO THE RELATED APPLICATIONS

This application is a bypass continuation application of International Application No. PCT/KR2021/020378, filed on Dec. 31, 2021, which claims priority to Chinese Patent Application No. 202110322406.1 filed on Mar. 25, 2021 and Chinese Patent Application No. 202110736466.8 filed on Jun. 30, 2021, the disclosures of which are incorporated herein in their entireties by reference.

BACKGROUND

1. Field

The disclosure relates to the field of computer technology, and more particularly, to a speech recognition method, an apparatus, an electronic device and a computer-readable storage medium.

2. Description of the Related Art

In the automated speech recognition (ASR) technology, it is often necessary to correct the errors in the speech recognition results in order to obtain more accurate speech recognition results. However, in the existing speech recognition technology, there is a problem for correcting recognized texts in that a wide variety of speech recognition errors are difficult to be detected completely, and the corrected results may be inaccurate. Therefore, there is a need to thoroughly detect variety of speech recognition errors and to improve accuracy of speech recognition.

SUMMARY

Additional aspects, features and advantages of the disclosure will be set forth in part in the description which follows, and in part, will be apparent from the following description of may be learned by practice of the disclosure.

According to an embodiment, there is provided a speech recognition method, the method including: acquiring a first speech recognition result of a speech; acquiring context information and pronunciation feature information about a target text unit in the first speech recognition result; and acquiring a second speech recognition result of the speech based on the context information and the pronunciation feature information.

The method further includes: acquiring perplexities of a plurality of text units in the first speech recognition result; and determining the target text unit among the plurality of text units based on the perplexities.

The determining the target text unit based on the perplexities includes: determining a first text unit among the plurality of text units having the perplexity not less than a first preset threshold as the target text unit; or acquiring a second text unit among the plurality of text units based on the first text unit and at least one text unit before or after the first text unit, and determining the second text unit as the target text unit.

The acquiring the context information about the target text unit in the first speech recognition result includes: replacing the target text unit in the first speech recognition result with a preset mask to obtain an input text sequence; and acquiring the context information corresponding to the target text unit based on the input text sequence.

The acquiring the pronunciation feature information about the target text unit in the first speech recognition result includes: acquiring a first phoneme set of the target text unit; and acquiring the pronunciation feature information about the target text unit based on the first phoneme set.

The acquiring the pronunciation feature information about the target text unit based on the first phoneme set includes: obtaining phonemes in the first phoneme set as the pronunciation feature information about the target text unit; or replacing at least one phoneme in the first phoneme set to obtain a second phoneme set, and using phonemes in the second phoneme set as the pronunciation feature information about the target text unit.

The replacing the at least one phoneme in the first phoneme set to obtain the second phoneme set includes: based on a preset rule, acquiring at least one candidate replacement phoneme of the phonemes in the first phoneme set and a probability that the at least one candidate replacement phoneme is used as a replacement phoneme of a corresponding phoneme in the first phoneme set; and replacing the corresponding phoneme with the at least one candidate replacement phoneme having the probability not less than a second preset threshold.

The acquiring the second speech recognition result of the speech based on the context information and the pronunciation feature information includes: acquiring fusion information, based on the context information and the pronunciation feature information; acquiring a predicted text of the target text unit based on the fusion information; and replacing the target text unit in the first speech recognition result with the predicted text to obtain the second speech recognition result.

The acquiring the fusion information based on the context information and the pronunciation feature information includes: based on a multi-head co-attention mechanism network, using the pronunciation feature information as a query, and using the context information as a key and value, fusing the pronunciation feature information with the context information to obtain the fusion information.

The acquiring the predicted text of the target text unit based on the fusion information includes: decoding the fusion information to obtain the predicted text of the target text unit.

The decoding the fusion information to obtain the predicted text of the target text unit includes: for a current target text unit among a plurality of text units, decoding the fusion information based on the predicted text of a previous target text unit among the plurality of text units to obtain the predicted text of the current target text unit.

The acquiring the first speech recognition result of the speech to be recognized includes: acquiring the speech in at least two languages, and acquiring at least one candidate speech recognition result for each language of the at least two languages; acquiring a word lattice corresponding to the each language based on the at least one candidate speech recognition result; and performing a path searching in the word lattice corresponding to the each language, and using a text sequence corresponding to an optimal path as the first speech recognition result.

The acquiring the word lattice corresponding to the each language based on the at least one candidate speech recognition result includes: acquiring a start time interval and an end time interval of a text unit in the at least one candidate speech recognition result, and acquiring a longest common subsequence corresponding to the at least one candidate speech recognition result; and acquiring the word lattice corresponding to the each language, based on the start time interval, the end time interval of the text unit, and the longest common subsequence.

The performing the path searching in the word lattice corresponding to the each language includes: acquiring a sequence of a plurality of text units based on the start time interval and the end time interval of each of the plurality of text units in the word lattice corresponding to the each language; performing the path searching based on the sequence of the plurality of text units to obtain a first path set; and skipping any one of the plurality of text units in the first path set by a preset number of text units and connecting with a next text unit among the plurality of text units to obtain a second path set.

The acquiring the first speech recognition result of the speech to be recognized includes: acquiring the speech in at least two languages; performing encoding respectively for each language of the at least two languages to obtain a speech feature; and performing decoding based on the speech feature corresponding to the each language respectively and a text information feature of the speech, to obtain the first speech recognition result of the speech.

The performing the decoding based on the speech feature corresponding to the each language respectively and the text information feature of the speech to obtain the first speech recognition result of the speech includes: based on a multi-head co-attention mechanism network, using the text information feature as a query, using the speech feature corresponding to the each language as a key and value, and acquiring a first decoding feature corresponding to the each language; performing a linear classification on the first decoding feature to obtain a weight coefficient of the first decoding feature; and acquiring the first speech recognition result based on the first decoding feature and the weight coefficient.

The acquiring the first speech recognition result based on the first decoding feature and the weight coefficient includes: acquiring a second decoding feature of the speech based on each of the first decoding feature and the weight coefficient; acquiring a language classification feature of the speech based on the second decoding feature; and concatenating the second decoding feature and the language classification feature, and acquiring the first speech recognition result based on a concatenating result.

According to an embodiment, there is provided a speech recognition method, the method including: acquiring a speech in at least two languages, and acquiring at least one candidate speech recognition result for each language of the at least two languages; acquiring a word lattice corresponding to the each language based on the at least one candidate speech recognition result; and performing a path searching in the word lattice corresponding to the each language, and using a text sequence corresponding to an optimal path as a first speech recognition result.

The acquiring the word lattice corresponding to the each language based on the at least one candidate speech recognition result includes: acquiring a start time interval and an end time interval of a text unit in the at least one candidate speech recognition result, and acquiring a longest common subsequence corresponding to the at least one candidate speech recognition result; and acquiring the word lattice corresponding to the each language, based on the start time interval and the end time interval of the text unit, and the longest common subsequence.

The performing the path searching in the word lattice corresponding to the each language includes: acquiring a sequence of a plurality of text units based on the start time interval and the end time interval of each of the plurality of text units in the word lattice corresponding to the each language; performing the path searching based on the sequence to obtain a first path set; and skipping any one of the plurality of text units in the first path set by a preset number of text units and connecting with a next text unit to obtain a second path set.

According to an embodiment, there is provided a speech recognition method, the method including: acquiring a speech in at least two languages; performing encoding on each language of the at least two languages to obtain speech features; and performing decoding based on a speech feature corresponding to each language respectively and a text information feature of the speech to obtain a first speech recognition result of the speech.

The performing the decoding based on the speech feature corresponding to each language respectively and the text information feature of the speech to obtain the first speech recognition result of the speech to be recognized includes: based on a multi-head co-attention mechanism network, using the text information feature as a query, using the speech feature corresponding to each language as a key and value, and acquiring a first decoding feature corresponding to the each language; performing a linear classification on the first decoding feature to obtain a weight coefficient of the first decoding feature; and acquiring the first speech recognition result based on the first decoding feature and the weight coefficient.

The acquiring the first speech recognition result based on the first decoding feature and the weight coefficient includes: acquiring a second decoding feature of the speech based on the first decoding feature and the weight coefficient; and acquiring a language classification feature of the speech based on the second decoding feature; concatenating the second decoding feature and the language classification feature, and acquiring the first speech recognition result based on a concatenating result.

According to an embodiment, there is provided a speech recognition apparatus, including: a processor configured to: acquire a first speech recognition result of a speech; acquire context information and pronunciation feature information about a target text unit in the first speech recognition result; and acquire a second speech recognition result of the speech based on the context information and the pronunciation feature information.

According to an embodiment, there is provided a speech recognition apparatus, including: a processor configured to: acquire a speech in at least two languages, and acquiring at least one candidate speech recognition result for each language of the at least two languages; acquire a word lattice corresponding to the each language based on the at least one candidate speech recognition result; and performing a path searching in the word lattice corresponding to the each language, and using a text sequence corresponding to an optimal path as a first speech recognition result.

According to an embodiment, there is provided a speech recognition apparatus, including: a processor configured to: acquire a speech in at least two languages; perform encoding for each language of the at least two languages to obtain corresponding speech features; and perform decoding based on a speech feature corresponding to the each language respectively and a text information feature of the speech to obtain a first speech recognition result of the speech.

According to an embodiment, there is provided an electronic device, including: a memory configured to store computer programs; and a processor configured to execute the computer programs to implement the speech recognition method described above.

According to an embodiment, there is provided a non-transitory computer-readable storage medium storing a computer program, when executed by a processor, causes the processor to implement the speech recognition method described above.

BRIEF DESCRIPTION OF THE DRAWINGS

The above and other aspects, features and advantages of certain embodiments of the present disclosure will be more apparent from the following description, taken in conjunction with the accompanying drawings, in which.

DETAILED DESCRIPTION

Figure 1:
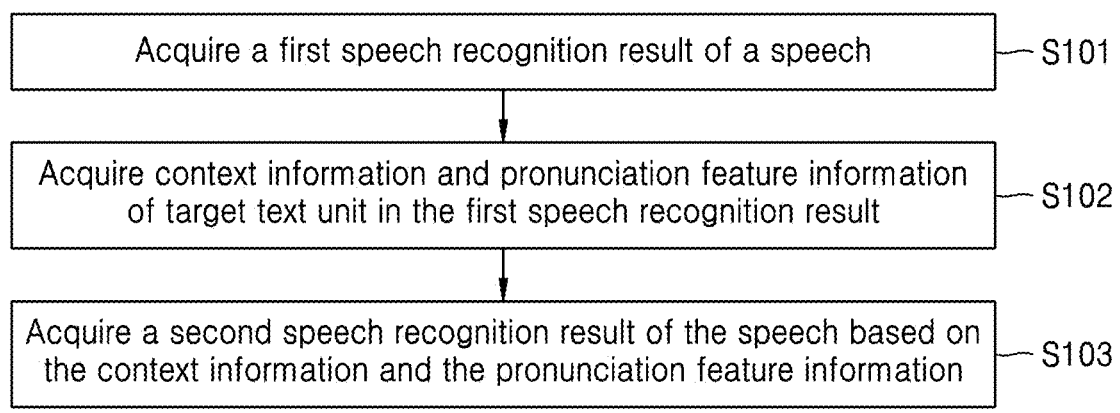
FIG. 1 is a flowchart describing a speech recognition method according to an embodiment.

Embodiments of the present disclosure are described in detail below. Examples embodiments are shown in the accompanying drawings, wherein the same or similar numerals indicate the same or similar elements or elements with the same or similar functions throughout. The embodiments described below with reference to the accompanying drawings are examples, and are only used to explain the present disclosure, and may not be construed as a limitation to the present disclosure.

Those skilled in the art may understand that, unless specifically stated, the singular forms "a", "an", "said" and "the" used herein may also include plural forms. It should be further understood that the phrase "comprising" used in the specification of the present disclosure refers to the presence of said features, integers, steps, operations, elements and/or components, but does not exclude the presence or addition of one or more other features, integers, steps, operations, elements, components, and/or groups thereof. It should be understood that when we refer to an element as being "connected" or "coupled" to another element, it may be directly connected or coupled to the other element, or intervening elements may also be present therebetween. Further, "connected" or "coupled" used herein may include wireless connection or wireless coupling. The phrase "and/or" used herein includes all or any unit and all combinations of one or more associated listed items.

The error correction system in the existing speech recognition technology may be substantially divided into a rule-based system, a statistics-based system, and a neural network-based system. The rule-based system uses rules to correct speech recognition results; the statistics-based system uses statistics model to correct inaccurate speech recognition; the neural network-based system obtains a neural network model by training the model with the collected data and uses the trained neural network model to correct the speech recognition results. Specifically, it is very difficult for the rule-based system to fully cover the errors by rules due to a wide variety of speech recognition errors, and the usage scenarios are limited. The statistics-based system is being replaced by the neural network-based system due to the limitations of data and technology itself. The neural network-based system is currently the most widely used system, but still faces problems that there are a wide variety of speech recognition errors. It is very difficult for the neural network model to fully cover or recognize all the speech recognition errors, and the speech recognition may still be inconsistent in the context after the correction.

Further, some existing techniques combine the text information of the speech recognition results with the pronunciation information of a corresponding word, which may effectively deal with a wide range of errors caused by the pronunciation information, but it does not fully take into account the context information and cannot be applied to all languages, so there are restrictions on language categories.

In addition, the existing techniques need to generate error sample data as training data for the neural network model. Since the neural network model is highly dependent on data, the generated error samples have a great impact on the final result of the model.

Moreover, the existing techniques also have the following problems:

1. Low Quality: correction accuracy is low

When the recognition errors in the test set have not appeared on the training set, these recognition errors will be propagated to the results of the correction module, thereby resulting in low system robustness, which is very common in actual situations;

The user's pronunciation may have accent or wrong pronunciation leading to recognition errors. These wrong pronunciation sequences are also wrong and will also be propagated into the results of the correction module; and The original decoder will generate correction results from beginning to end, and there is a risk that an originally recognized correct word will instead be modified into the wrong word.

2. Slow Speed: The corrected time delay is linearly positively correlated with the length of the recognition result sequence.

When the recognition result is 10 to 20 words, the time delay taken to correct is about 100-200 ms, which is relatively slow and seriously affects user experiences.

3. Multi-lingual Speech Recognition: When a speech to be recognized contains a plurality of languages, if the speech to be recognized is recognized by adopting a speech recognition method for a certain specific language, which causes the obtained speech recognition result to be inaccurate, thus causes the subsequent correction results inaccurate.

With regard to the foregoing problems, the embodiments of the present disclosure provide a speech recognition method, apparatus and storage medium, which will be described in detail below.

FIG. 1 is a flowchart describing a speech recognition method according to an embodiment. As shown in FIG. 1, the method may include:

Step S101: Acquire a first speech recognition result of a speech to be recognized.

The first speech recognition result may be an initial text sequence obtained after recognizing a speech. There may be errors in the initial text sequence, and further error correction may be required to obtain more accurate text sequence, for example, a second speech recognition result, as described in more detail below. It may be understood that the initial text sequence may be obtained by various existing speech recognition methods.

Step S102: Acquire context information and pronunciation feature information of a target text unit in the first speech recognition result.

The text unit is a further division of the speech recognition result. Different language types may be divided in different ways. For example, a word in English may be used as a text unit, and a word or a phrase in Chinese may be used as a text unit. It may be understood that, in the embodiments of the disclosure, a way of dividing the text unit may be set according to the type of a speech to be recognized and actual requirements. In the embodiments, the target text unit is a text unit that may likely contain an error in the first speech recognition result and needs to be corrected. It should be understood that a plurality of target text units may be in the first speech recognition result.

Specifically, after the initial text sequence corresponding to the first speech recognition result is acquired, each target text unit for which correction is needed may be acquired, and the context information and the pronunciation feature information corresponding to each text unit are acquired.

Step S103: Acquire a second speech recognition result of the speech to be recognized based on the context information and the pronunciation feature information.

Specifically, for each target text unit, the target text unit is corrected based on the context information and pronunciation feature information of the target text unit to obtain the corresponding correct text (hereinafter referred to as "predictive text"), and the corresponding target text unit in the first speech recognition result is replaced with the predictive text to obtain the corrected text sequence, that is, the second speech recognition result.

The embodiments of the present disclosure correct the corresponding target text unit by acquiring the context information and pronunciation feature information of the target text unit that needs to be corrected in the first speech recognition result of the speech to be recognized, and combining with the context information and the pronunciation feature information. After the correction, the second speech recognition result is obtained. Because the context information and the pronunciation feature information of the target text unit are combined, so more error types may be covered in the correction process, and the accuracy of the correction result is improved.

In an embodiment, if the speech to be recognized contains at least two languages, acquiring the first speech recognition result of the speech to be recognized, includes acquiring at least one candidate speech recognition result for each language, acquiring a word lattice corresponding to each language based on the at least one candidate speech recognition result and performing path searching in the word lattice corresponding to the each language, and using the text sequence corresponding to an optimal path as the first speech recognition result.

When the speech to be recognized contains a plurality of languages, if the speech recognition method for some specific language is used to recognize the speech to be recognized, this will cause the obtained first speech recognition result to be inaccurate, which in turn lead to the subsequence recognition results also being inaccurate. The speech recognition method according to the embodiments of the disclosure provides a speech recognition output in response to multi-lingual speech to improve the accuracy of the first speech recognition result.

Figure 2A:
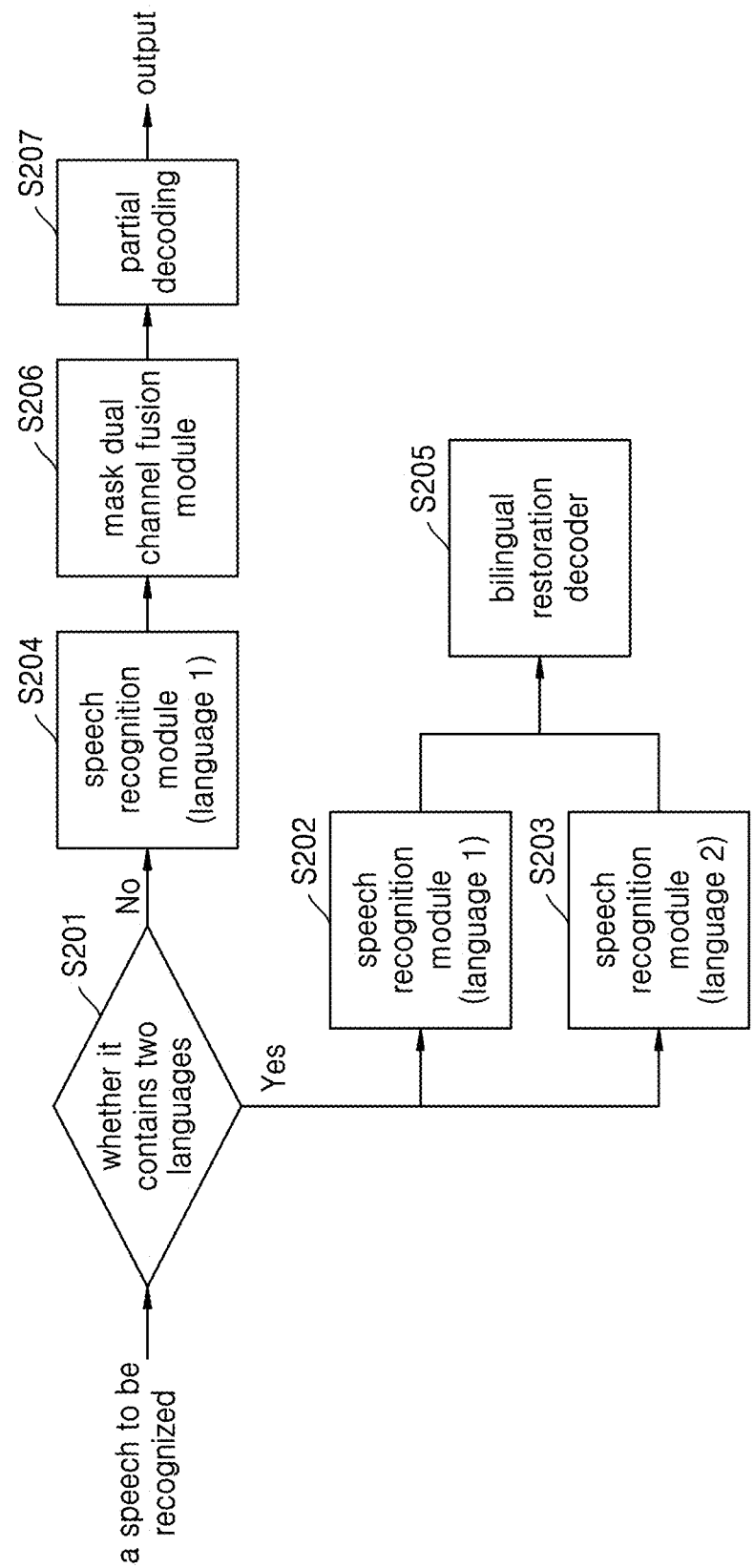
FIG. 2A is a flowchart of a speech recognition method according to an embodiment.

Referring to FIG. 2A, taking a situation wherein a multi-lingual speech to be recognized contains two languages as an example, the speech recognition method provided in the embodiment of the present disclosure may specifically include the following steps:

Step S201: Determine whether or not the speech to be recognized contains two languages. If the speech contains two languages (or two or more languages), proceed to steps S202 and S203. If the speech does not contain two languages, a recognition output be obtained via a speech recognition module for one language (e.g., the language identification module of language 1 in FIG. 2A), that is, the corresponding first speech recognition result is obtained (S204).

Steps S202 and S203: Obtain a candidate speech recognition result of the recognition output via the respective speech recognition modules of two known languages (e.g., the speech recognition modules of language 1 and language 2).

Step S205: Recognize the output candidate speech recognition result, and obtain the reconstructed recognition result via the bilingual recovery decoder, that is, obtain the corresponding first speech recognition result. The bilingual recovery decoder according to an embodiment may recover the bilingual recognition results by fuzzy boundary beam search when there are a plurality of languages in the speech to be recognized, without the need for accurate frame-level or word-level language identification, and avoid search errors caused by language identification errors, and does not require accurate timestamp information, thereby solving the aforementioned problem 3.

Step S206: The first speech recognition result is fused via the mask dual channel to obtain the vector that pays attention to the pronunciation content (e.g., the fusion information hereinafter). The mask dual channel fusion module is to locate the position of the speech recognition error and fuse the pronunciation channel and the context channel after mask. The mask dual channel fusion module in an embodiment can reduce noise in the parts of the recognized speech where the recognition result is wrong or inaccurate, thereby preventing the propagation of the recognition error, making the system more robust, and solving the aforementioned problem 1. Further, the mask dual channel fusion module can also expand one phoneme sequence into a plurality of similar phoneme sequences, which helps to reduce the recognition errors and error propagation problems caused by accent or pronunciation errors, and solves the aforementioned problems 2;

Step S207: The fusion information is finally output through a partial decoder, that is, the second speech recognition result of the speech to be recognized is obtained. The partial decoder uses a partial decoding method to decode only the parts where the speech recognition is wrong to generate the correct speech recognition results, thereby shortening the correction time delay, also avoiding the problem of modifying the original correctly recognized word into the wrong word, and solving the aforementioned problem 2.

Figure 2B:
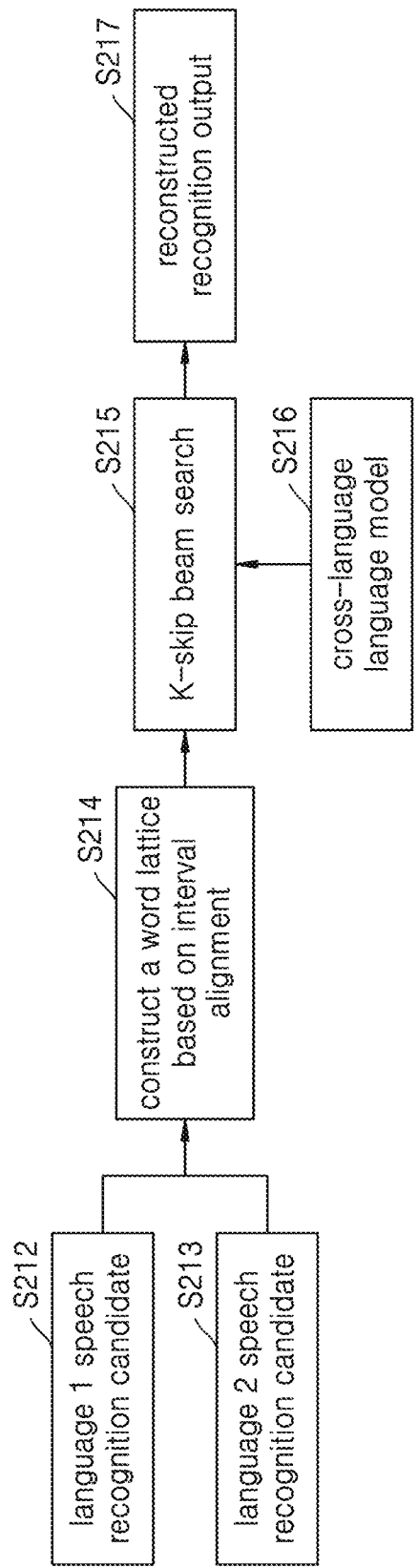
FIG. 2B is a flowchart of acquiring a first speech recognition result by a bilingual recovery decoder according to an embodiment.

Referring to FIG. 2B, acquiring the first speech recognition result through the bilingual recovery decoder in FIG. 2A may specifically include the following several steps:

Steps S212 and S213: Two speech recognizers in known languages are inputted to obtain the recognition results of the two languages (i.e., the language 1 speech recognition candidate and the language 2 speech recognition candidate in FIG. 2B) respectively, where the recognition result of each language includes one or more candidate speech recognition results.

Step S214: The candidate speech recognition results obtained are used to construct a word lattice based on interval alignment, that is, the candidate language identification results corresponding to each language may be used to construct a corresponding word lattice. Here, two word lattices may be constructed, but the embodiment is not limited thereto, and may construct two or more word lattices.

S215: The K-skip beam search is used to perform path search on the word lattice, and the obtained optimal path is used as the reconstructed bilingual recognition result, that is, the first speech recognition result is obtained.

The method of selecting the optimal path may be: obtaining a cross-language language model containing the two languages to calculate a language model score for each path obtained by path searching, and selecting the path with the highest score as the optimal path (S216).

The bilingual recovery decoder recover the bilingual recognition results through fuzzy boundary beam search. The function is that it does not require accurate frame-level or word-level language identification avoids search errors caused by the errors of language identification, and does not need accurate time stamp information more, may be used in end-to-end speech recognition.

In an embodiment, acquiring a word lattice corresponding to each language based on at least one candidate speech recognition result includes acquiring a start time interval and an end time interval of the text unit in the at least one candidate speech recognition result, and acquiring the longest common subsequence corresponding to the at least one candidate speech recognition result; and acquiring the word lattice corresponding to each language based on the start time interval and the end time interval of the text unit, as well as the longest common subsequence.

Specifically, the method for constructing a word lattice based on interval alignment may include the following steps:

Step S220: The candidate speech recognition results are inputted.

Step S222: The longest common subsequence algorithm is used to obtain the longest common subsequence. The candidate list is formed into a word lattice according to the longest common subsequence.

Step S224: The start time of the timestamp on each word on the word lattice is one time interval (that is, the start time interval), and the end time is one time interval (that is, the end time interval). The time interval is determined by the time information of each word of the original candidate list and the artificially given time interval threshold.

Figure 2C:
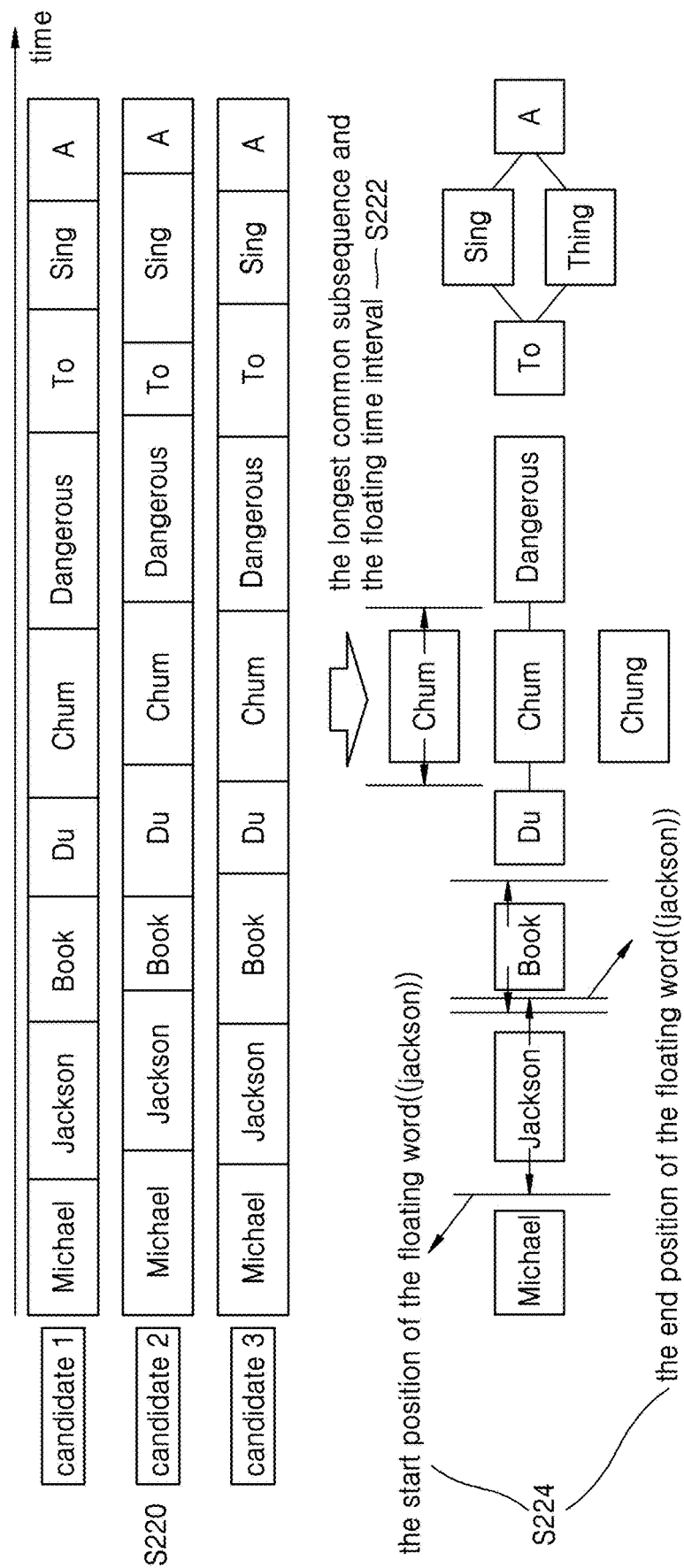
FIG. 2C is a schematic diagram of acquiring a word lattice according to an embodiment.

For example, as shown in FIG. 2C, for a segment of the speech to be recognized, for a certain language, the speech recognizer gives a plurality of candidate speech recognition results (e.g., candidate 1, candidate 2, and candidate 3, and other candidates), the start time and end time of each word in each candidate speech recognition result are both inaccurate timestamp information. The longest common subsequence "Michael Jackson Book Dangerous To A" is obtained according to the above-mentioned step S220. The word lattice as shown in the lower part of FIG. 2C is obtained according to the above-mentioned step S222. According to the above-mentioned step S224, the time stamp of each word on the word lattice is an interval, which is determined by the start time and end time of each candidate speech recognition result and an artificial threshold. The floating time interval of each word in FIG. 2C may be determined by the start time interval and the end time interval of the word. For example, the floating time interval of the word "Jackson" given in FIG. 2C is the corresponding time interval between the start position of the floating word (the start moment of the start time interval, which may be called Buffered Word Start, BWS) and the end position of the floating word (the end moment of the end time interval, which may be called Buffered Word End, BWE).

Figure 2D:
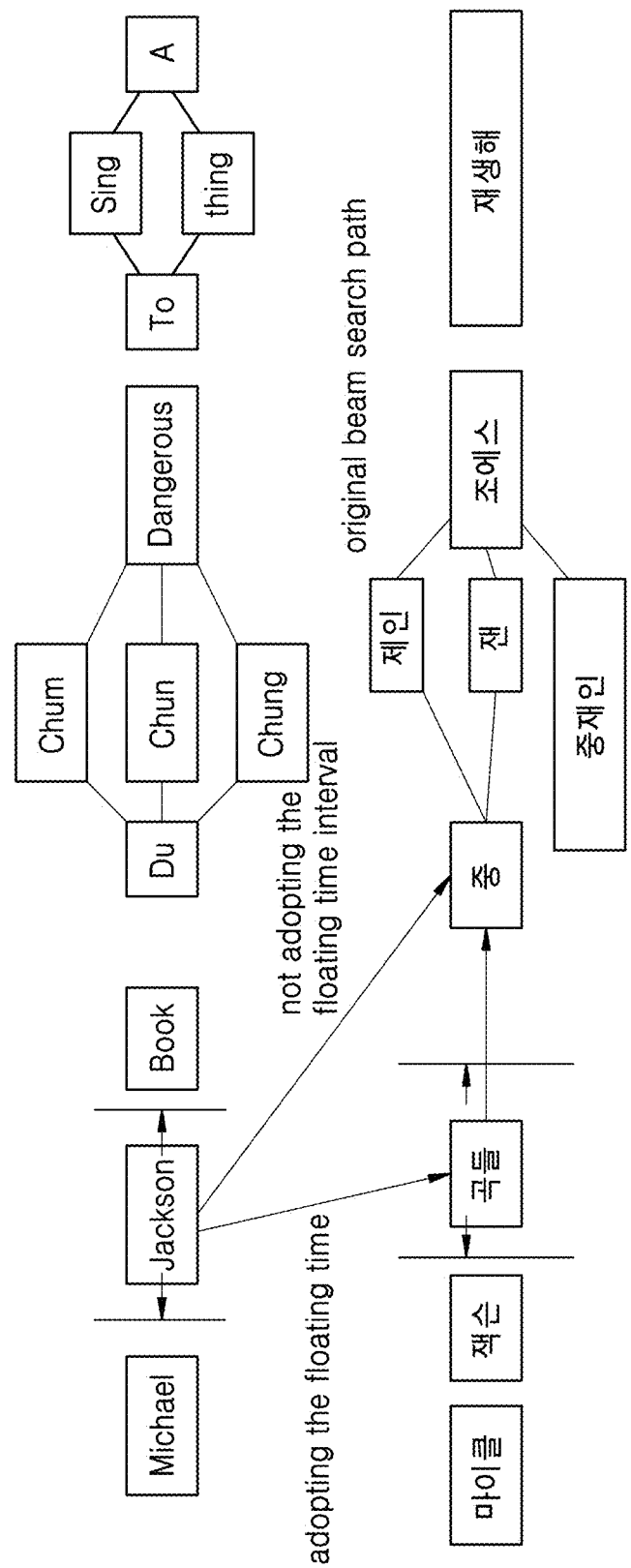
FIG. 2D is a schematic diagram of performing path searching based on word lattices according to an embodiment.

As shown in FIG. 2D, the upper part is a word lattice corresponding to English, and the lower part is a word lattice corresponding to Korean. Since each word floats within a certain time interval (that is, each word corresponds to a floating time interval), the search path will be more flexible. As shown in FIG. 2D, adopting the floating time interval, the path "Michael Jackson 곡들 중 " may be searched. If the floating time interval is not adopted, the search path will exclude the above path.

In an embodiment of the present disclosure, performing path searching in the word lattice corresponding to each language includes: acquiring the sequence of text units based on the start time interval and end time interval of the text unit in the word lattice corresponding to each language; performing path searching based on the sequence to obtain the first path set; and skipping any text unit in the first path by a preset number of text units and then connecting with a next text unit to obtain a second path set.

The first path set and the second path set are obtained through the path searching, and the second path set may be understood as a supplement and expansion to the first path set.

Specifically, the above-mentioned path searching may also be called K-skip beam search, and the K-skip beam search may specifically include the following:

After obtaining the word lattices of the two languages, the respective word lattices are sorted according to the time interval of each word in the word lattices.

The search path composed of neighboring nodes are determined. All neighboring nodes on the path must be adjacent to each other in the position in the word lattice. In this way, a plurality of first paths may be searched, that is, the first path set may be obtained; Wherein, the method of judging two nodes being neighboring nodes may be: if and only if no other node C satisfies i) BWS(C) (start position of floating words corresponding to node C) is between BWS (A) (start position of floating words corresponding to node A) and BWS(B) (start position of floating words corresponding to node B); ii) BWE(C) (end position of floating words corresponding to node C) is between BWE(A)) (end position of floating words corresponding to node A) and BWE(B) (end position of floating words corresponding to node B), then it may be considered that the node A and the node B are adjacently connected.

Expand on the search path obtained. Each word may skip K words to search, and then a plurality of second paths may be searched in this way, that is, a second path set is obtained.

Figure 2E:
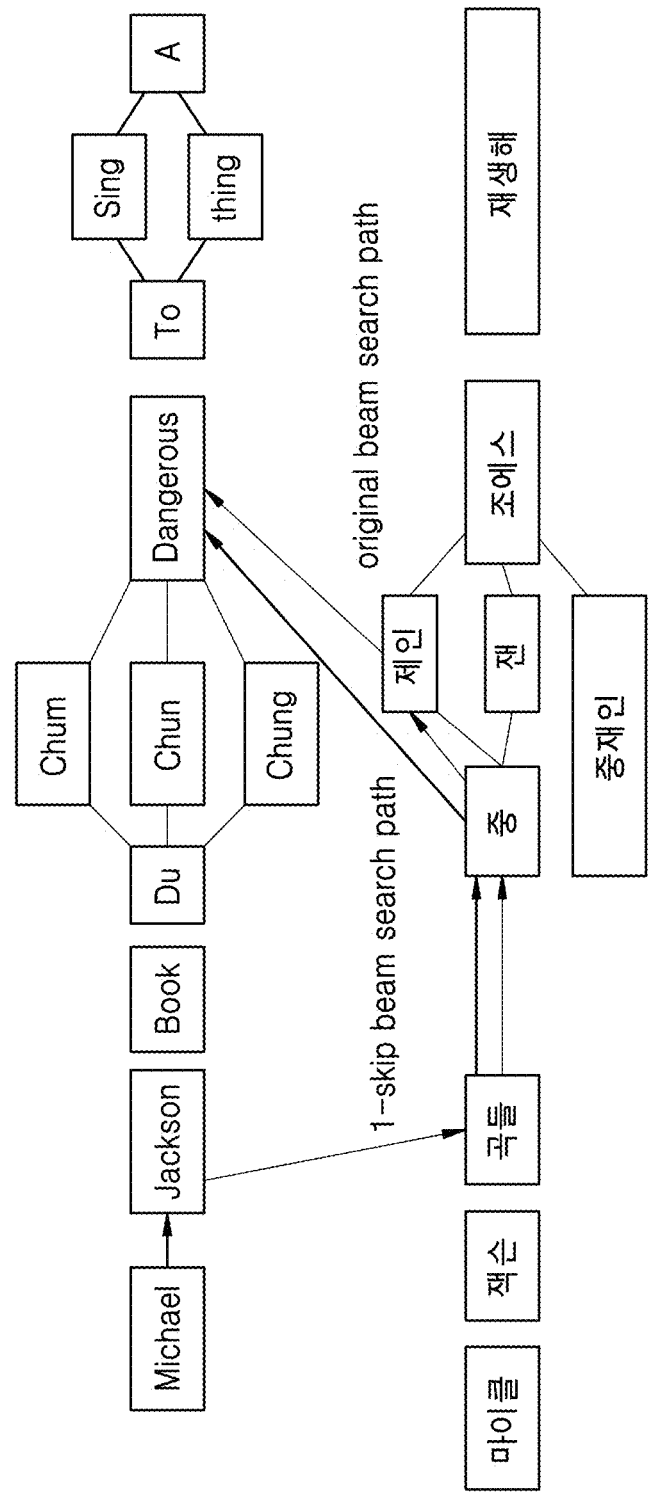
FIG. 2E is a schematic diagram of performing path searching based on word lattices according to an embodiment.

As shown in FIG. 2E, on the original beam search path, the operation of expanding the search path to skip K words may increase the space of the search path (k=1 in the figure, that is, 1-skip beam search path), and it is easier to include the correct search path. For example, if this method is not used, the search path will not contain "Michael-Jackson- -곡들-중- -Dangerous- -재생해"". The value of K may be set based on experience before the path searching is performed. The length of the path needs to be considered when setting the value of K to ensure that the path length is not exceeded after skipping K words.

It should be noted that the above-mentioned description of acquiring the first speech recognition result of the speech including two languages is an example. It should be understood that the above-mentioned steps may be applied to speeches including two or more languages.

If the speech to be recognized contains at least two languages, recognition error may occur in the speech recognition. The bilingual hybrid recognition system may design neural network models of different architectures, one is based on the model design of the recurrent neural network, and the other is based on the transformer model. The two language encoders are used to extract the features of the respective languages, obtain the weight coefficients of these two features through linear classification, obtain a mixed feature output through weight addition, and enter the decoder for decoding operation.

The recurrent neural network model generally has poorer performance and cannot achieve the requirements of daily applications; the transformer-based model mainly focuses on the encoder to do classification optimization of some languages and does not fully take into account the classification information of the text. There are disadvantages in bilingual distinction, which causing misrecognition problem of bilingual transformation in sentences.

1. With regard to the problem that the performance of the recurrent neural network model being poor, the embodiments of the present disclosure use an architecture based on multi-encoder and language-aware decoder, which can unite bilingual respective encoders, share one decoder to improve the overall performance while controlling the amount of overall parameters.

2. With regard to the problem that the transformer model is only optimized at the encoder module, the embodiments of the present disclosure use the monolingual information obtained by the decoder, and use the features of language classification that is capable of obtaining better bilingual discrimination, and at the same time use the language classification information of the text at the output layer to assist training to obtain better model parameters and decoding performance.

The network architecture of multi-encoder and language-aware decoder in the embodiments of the present disclosure may not only make full use of monolingual data resources and encoder parameters to obtain the features of the respective languages, but also require only one decoder to achieve the requirement for better bilingual discrimination, so that the problem of bilingual mixed recognition in the same sentence is solved without reducing the performance of monolingual recognition.

In an embodiment of the present disclosure, if the speech to be recognized contains at least two languages, another method for acquiring the first speech recognition result is: a method based on multi-encoder and language-aware decoder. Taking the speech to be recognized containing two languages as an example, the method may specifically include the following steps:

Step 1: Perform feature extraction, speech enhancement, convolutional down-sampling, and linear transformation to obtain a speech feature x (i.e. low-dimensional speech feature) in sequence on the speech to be recognized. We use a conformer-based encoder that may capture global and local features of the entire speech sequence, and input the speech feature x to the encoders corresponding to two languages at the same time respectively, and each encoder outputs two high-dimensional speech features $key_i$ and $value_i$ (Equation 2), wherein the subscript i represents the language type (such as Chinese and English). It should be understood that the step of speech enhancement only exists in the training phase. In practical applications, the encoder may include N serially arranged encoder modules as shown in FIG. 2F, and N is an integer greater than or equal to 1.

Figure 2F:
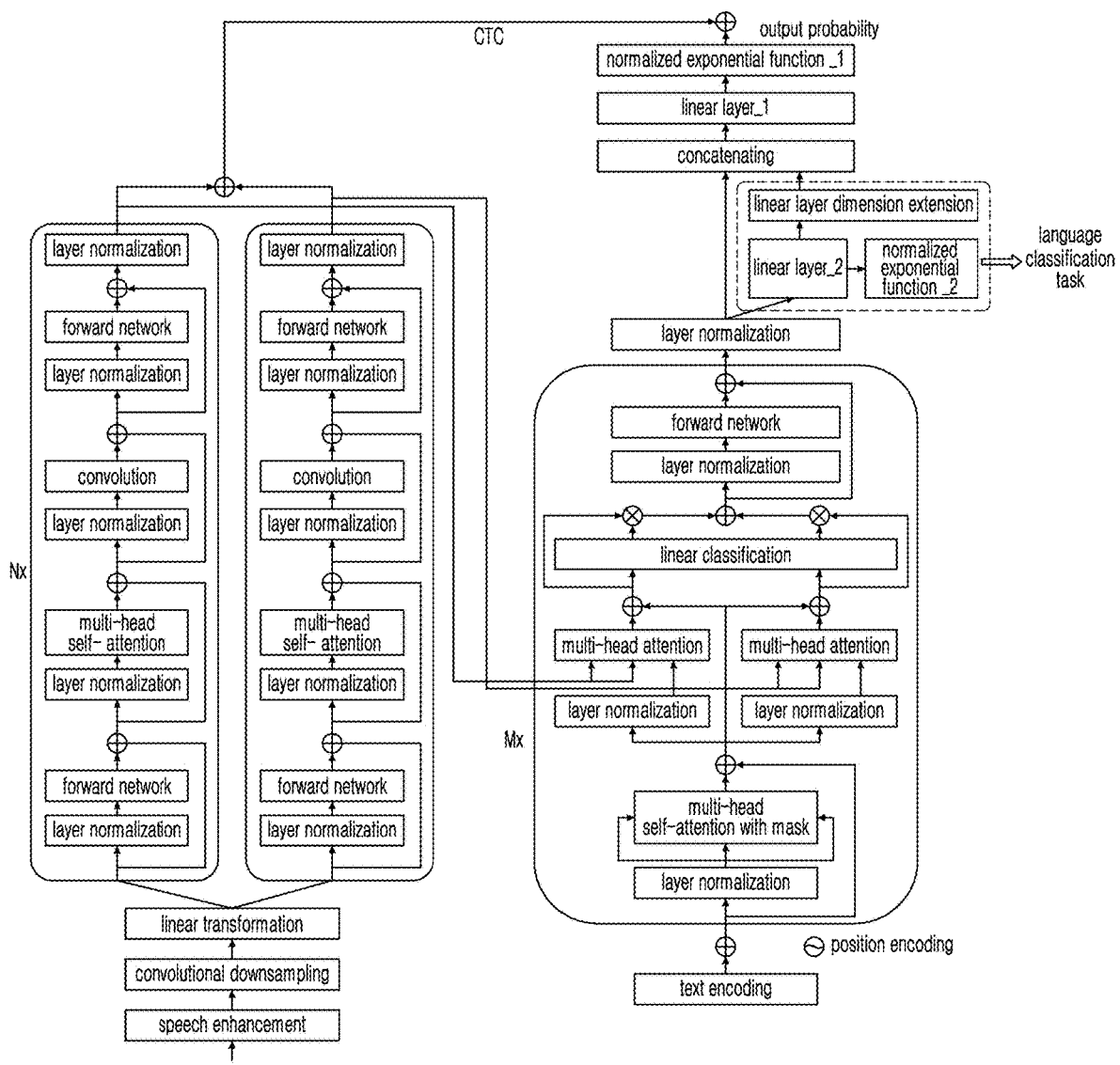
FIG. 2F is a schematic diagram of a speech recognition method according to an embodiment.

As the two encoder modules on the left side of FIG. 2F, the two encoder modules are respectively responsible for the input feature encoding of their respective languages. Therefore, the two encoders use large amounts of data of their respective languages for pre-training respectively, and then migrate these parameters to the multi-head attention module of the multi-encoder and decoder, so the multi-encoder system has faster convergence speed and better performance optimization. After calculating by the multi-head self-attention and convolution module wrapped by the two graph forward networks, the resulting high-dimensional vector output of the final output is added and entered into the CTC (Connectionist Temporal Classification) loss calculation, and at the same time, these two high-dimensional vectors, namely $key_i$ and $value_i$, are respectively associated with the calculation of the multi-head attention of each decoder layer in the subsequent steps (Equation 3).

Step 2: In the calculation of the decoder, the standard multi-head attention layer output s (i.e. text information feature) inside each module is firstly normalized by layer (Equation 1) to obtain query$_i$, where i is the language label (for example, i=1 represents Chinese, i=2 represents English), the output key$_i$ and query$_i$ of the respective encoders in the joint step 1 are passed through the multi-head attention calculation mechanism, simply referred to as MHA$_i$, and the residual of the input s is connected to obtain the output r$_i$ (Equation 3), r$_1$ and r$_2$ are subjected to linear classification and normalized exponential softmax operation (Equation 4) (where r$_1$ and r$_2$ are the first decoding features corresponding to different languages respectively, where w$_1$, w$_2$ are the weights corresponding to r$_1$ and r$_2$ respectively), thus obtaining weight coefficients α$_1$ and α$_2$ associated with two languages. The weighted sum of these two coefficients (Equation 5) is used to obtain z (e.g., the second decoding feature) which is entered into the layer normalization and forward network module. By obtaining weight coefficients through this unsupervised learning mechanism, rather than specifying hyper parameters in advance, the system may learn more flexibly to master the skip method between different languages in a sentence, while does not affecting the recognition of respective monolingual language. It should be noted that, in practical applications, the decoder (also known as a language-aware decoder) may include M serially arranged decoder modules as shown in the figure, and M is an integer greater than or equal to 1.

$$\text{query}_i = \text{LayerNorm}_i(s) \quad (1)$$

$$\text{key}_i = \text{value}_i = \text{Encode}_i(x) \quad (2)$$

$$r_i = s + \text{MHA}_i(\text{query}_i, \text{key}_i, \text{value}_i) \quad (3)$$

$$\alpha_1, \alpha_2 = \text{softmax}(r_1 * w_1 + r_2 * w_2 + \text{bias}) \quad (4)$$

$$z = \alpha_1 * r_1 + \alpha_2 * r_2 \quad (5)$$

Figure 2G:
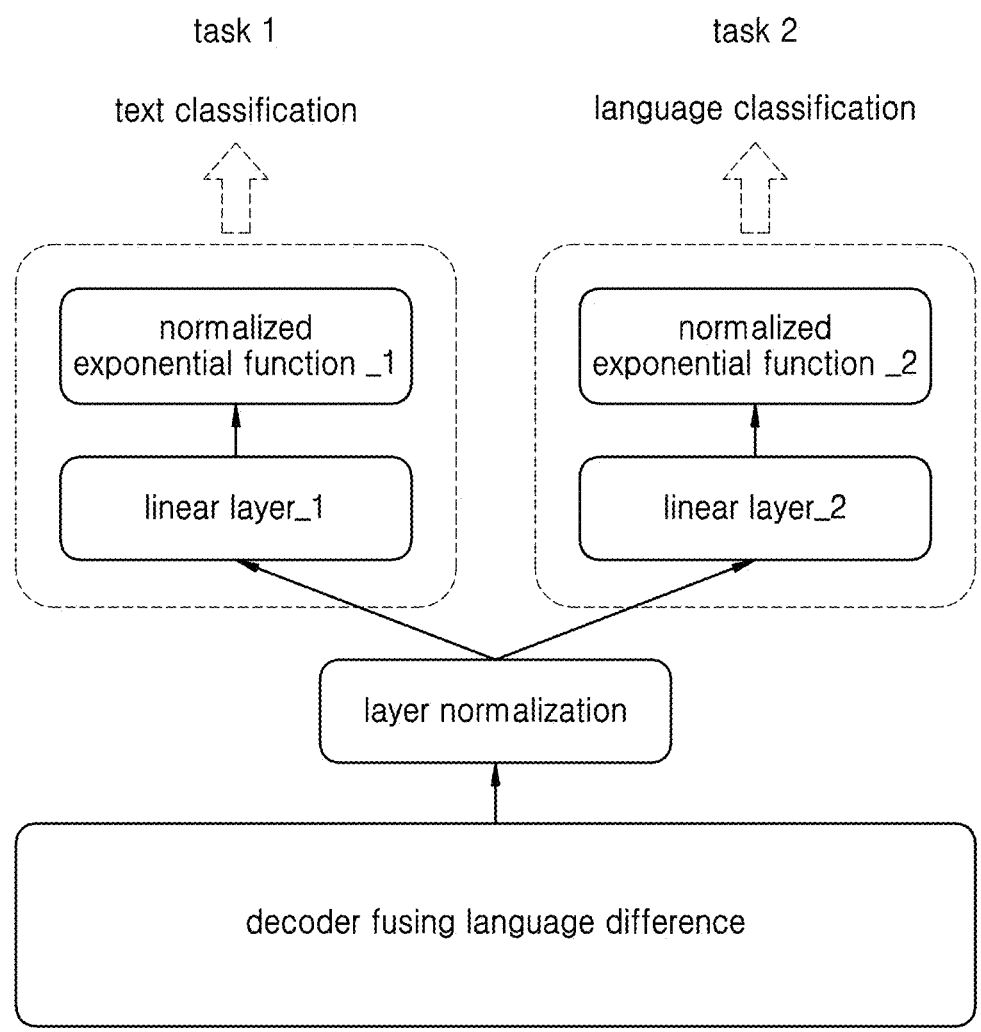
FIG. 2G is a schematic diagram of a first stage training process according to an embodiment.
Figure 2H:
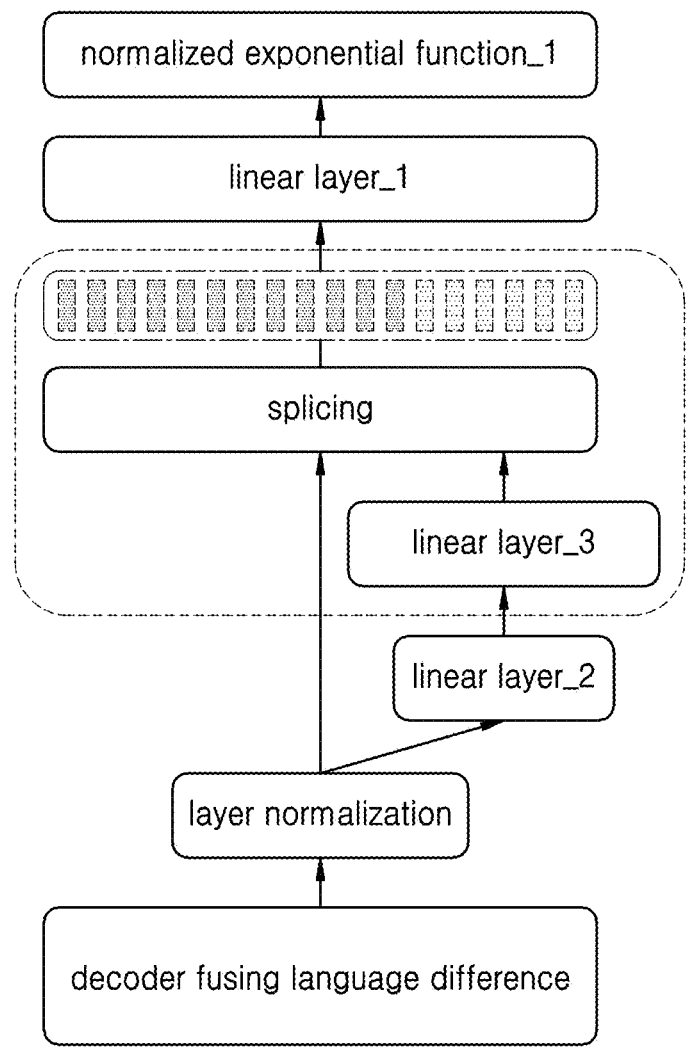
FIG. 2H is a schematic diagram of a second stage training process according to an embodiment.
Figure 2I:
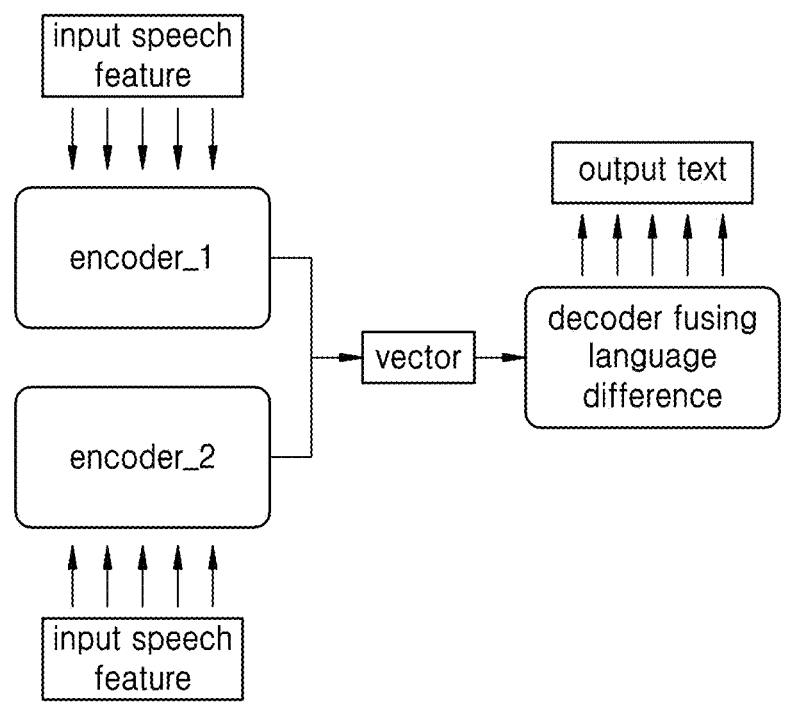
FIG. 2I is a schematic diagram of a network of a decoder based on multiple encoders and a fusion language difference according to an embodiment.

As shown in FIG. 2I, it is a schematic diagram of network of a multi-encoder and language-aware decoder.

Step 3: In the training phase, the decoder output layer has two losses, one is an normal text classification attention loss, as obtained by using linear layer_1 and softmax_1 (normalized exponential function_1) as shown in FIG. 2G, and the other is a language classification loss as obtained by linear layer_2 and softmax_2 (normalized exponential function_2). The purpose of increasing the language loss is to use the natural classification ability of the text, which may assist the model to obtain better classification performance in decoding. For calculation of the language loss, the input text sequence of the decoder needs to be firstly converted into a language sequence. In the first stage of training, Equation (6) is used to calculate the loss and update parameters, where L$_{MOL}$ is the total loss, L$_{CTC}$ is the CTC loss, La$_{Attention}$ is the attention loss, L$_{lid}$ is the language classification loss, λ is the adjustable parameter, and its value is in the interval [0,1].

$$L_{MOL} = \lambda L_{CTC} + 0.8*(1-\lambda)La_{Attention} + 0.2*(1-\lambda)L_{lid} \quad (6)$$

In order to enable the language classification linear layer_2 to still participate in the operation in decoding, based on the fact that the decoder output and the language classification output have a large dimensional difference, the dimension extension linear layer_3 is designed and added. As shown in FIG. 2H, in order to match the dimension of output of the decoder, the dimension of the linear layer_3 is set to the square root of size of the dimension of output of the decoder, and then the output of the decoder and the output of the linear layer_3 (i.e. the language classification feature) are concatenated to enter the final linear layer_1 and the normalized exponential function to obtain the decoded text output (i.e. the first speech recognition result). The parameters of the added linear layer_3 are arbitrarily initialized, and then obtained during the second stage of training after the linear layer_2 converges. FIG. 2H is also the framework when the model is decoded.

It should be noted that the above descriptions of acquiring the first speech recognition result of the speech to be recognized use an example of a speech containing two languages. It should be understood that the embodiments of the present disclosure are not limited to the above example.

In an embodiment, the method may further include: acquiring a perplexity of the text unit in the first speech recognition result; and determining a target text unit based on the above-mentioned perplexity, wherein the target text unit may be determined based on the first text unit having a perplexity not less than a first preset threshold.

Specifically, while obtaining the first speech recognition result of the speech to be recognized, the perplexity of each text unit in the initial text sequence may also be obtained. Here, the larger the perplexity corresponding to the text unit, the lower the accuracy of the speech recognition system, that is, the higher the error rate of the text unit. Therefore, the text unit having a perplexity greater than or equal to a first preset threshold in the first speech recognition result may be referred to as the first text unit, and a target text unit is determined based on these first text units.

Specifically, in the process of obtaining the first speech recognition result, each text unit corresponds to a plurality of initial predicted texts, and each initial predicted text corresponds to a probability value, and the initial predicted text having the largest probability value may be used as the final prediction result (that is, the final text unit corresponding to the first speech recognition result). The perplexity of each text unit in the first speech recognition result is obtained based on the probability value of its initial predicted text. The calculation formula may be:

$$\text{loss}_i = -\log(p_j) \quad (7)$$

Here, loss$_i$ represents a perplexity of the i-th text unit, p$_j$ represents the probability value of the j-th initial predicted text corresponding to the i-th text unit, and the probability value is the largest probability value among the probability values corresponding to each initial text.

Further, determining the target text unit based on the perplexity includes: determining the first text unit as the target text unit; or acquiring a corresponding second text unit based on the first text unit and at least one text unit before and/or after the first text unit, and determining the second text unit as the target text unit.

Specifically, the first text unit may be directly used as the target text unit. On the other hand, when considering the perplexity assigned to each text unit in the speech recognition process, a situation in which a text unit with errors, especially the one or more text units immediately before or after the first text unit be assigned to a smaller perplexity can arise, and then the perplexity of the text unit may be less than the first preset threshold value, and then it is determined as a text unit that does not need to be corrected. The existence of this situation will not only causes the text unit before or after the above-mentioned text unit that needs to be corrected not to be corrected, but also causes the correction result of the previous text unit of the text unit assigned with a smaller perplexity (i.e., a predictive text) to be inaccurate, which in turn causes the second speech recognition results obtained by the correction to be inaccurate. In an embodiment, if a text unit before or after a first text unit is a text unit having a perplexity less than the first preset threshold, in addition to marking the first text unit as the target text unit, a text unit before or after the first text unit may also be marked as the target text unit, and the text unit before or after and the first text unit are merged into a second text unit, and then the respective target text units contained in the second text unit are taken as a whole, that is, the second text unit is used as a target text unit for subsequent corrections. It may be understood that only the text unit before the first text unit may be marked, or only the text unit after the first text unit may be marked, or the text units before and after the first text unit may be marked, and the number of text units to be marked specifically may be determined according to actual requirement (e.g., a predetermined value set by a user).

Specifically, for the first speech recognition result, assuming that the number of text units included is L, the process of acquiring the target text unit may be understood as a process of marking the target text in the first speech recognition result, which may comprise specifically:

(1) Firstly, sort the perplexities;

(2) Mark the text unit corresponding to the first N largest perplexities, where N may be determined by the following formula:

$$N = f^{roundup}(L/l) \quad (8)$$

Here, l is the default value, $f^{roundup}()$ represents rounding up the value in parentheses, so one may control the size of N by taking different values for l, for example, if l takes 5, then N=L/5 is rounded up;

(3) Set the first preset threshold value to θ, regardless of the text unit having a perplexity less than θ, in other words, the text unit having a perplexity not less than θ among the first N text units is the first text unit;

(4) Mark each first text unit, and mark the first $w_{\{bf\}}$ text units and the last $w_{\{bh\}}$ text units of the first text unit, then the position that is marked continuously is regarded as a mark group (i.e. the second text unit), where $w_{\{bf\}} \geq 0$, $w_{\{bh\}} \geq 0$. For example, the marked text sequence [$A_0$, $B_1$, $C_1$, $D_0$, $E_1$, $F_1$, $G_0$] is completed, where 1 is the marked position, then BC is a marked group, and EF is a marked group, that is, BC and EF will be used as the target text unit, and its corresponding corrected text is acquired in the subsequent solution.

For example, a certain first speech recognition result is "i was about to have my first dry grace ever", wherein the perplexities of the words "about", "to", "dry", and "grace" are 1.44, 0.11, 1.66, 1.27 respectively, the perplexity of each word are compared with the first preset threshold, and "about" and "dry" are the first text units. The embodiment of the present application may directly use "about" and "dry" as the target text unit, may also mark the "to" after "about" as the target text unit, mark the "grace" after "dry" as the target text unit, then the two second text units "about to" and "dry grace" are obtained, and then use "about to" and "dry grace" as the target text unit. In the subsequent correction, one may get that the predicted text corresponding to the target text unit should be "drag race". It may be understood that, in this example, it is equivalent to setting $w_{\{bf\}} \geq 0$ to 0 and setting $w_{\{bh\}}$ to 1.

In an embodiment of the present disclosure, acquiring the context information of the target text unit in the first speech recognition result includes: replacing the target text unit in the first speech recognition result with a preset mask to obtain a corresponding input text sequence; and acquiring the context information corresponding to the target text unit based on the input text sequence.

Specifically, the target text unit in the first speech recognition result is replaced with a preset mask to obtain the input text sequence. Then, the input text sequence is input to a context extraction model, and the context information of each mask, that is, the context information of each target text unit is output.

The context extraction model may be any kind of existing language pre-training model, or may be a new model combined with different neural networks that may achieve the same purpose of context information extraction.

For example, assuming the context extraction model is a BERT model, the target text unit is replaced with a preset mask that has been pre-trained in the BERT model, and then the input text sequence obtained after the replacement is input into the BERT model, thereby obtaining context information sequence with the same length as the input text sequence. Then, according to the position of the target text unit in the input text sequence, the context information corresponding to each target text unit is extracted from the context information sequence. If there are other text units between the two target text sequence units, a separator is added in the context information of the two target units for subsequent matching and fusion with the corresponding pronunciation feature information. Further, assuming the information vector set of the i-th tag group (i.e. the target text unit) is denoted as $C_i = (c_{i0}, c_{i1}, \ldots)$, after adding the separator information vector s, the context information corresponding to the output extracted by the context finally may be denoted as: $C = f^{concat}(C_0, s, C_1, s, \ldots, C_m)$, where m is the number of the target text units, $f^{concat}()$ represents to concatenate the vectors in the brackets in the 0 first dimension.

In training phase of the model, for the text sequence in the training data, the following marking method may be used to obtain the target text unit:

(1) Mark the text unit at any position in the text sequence with the first probability (such as 10%).

(2) When any position in the text sequence is marked, the next position is marked with the second probability (such as 50%); for the next position, if it is marked successfully, the subsequence positions are continuously marked (e.g., the third probability (such as 50%)). It is looped until the next position is not marked or the text sequence ends.

(3) Discard the text sequence without any marks; discard the text sequence with the number of marked positions in the total number of positions exceeding the preset proportion with the fourth probability (such as 80%), thereby obtaining a text sequence in which the target text units are marked for training.

The first probability, the second probability, the third probability, the fourth probability, and the preset ratio may be set according to actual requirements (e.g., predetermined values set by a user).

Finally, the obtained marking position (i.e. the target text unit) may be enabled to account for a proper preset ratio (for example, about 30%) of the total length of the text sequence through the abovementioned marking method. Considering that a long-sounding text unit may be incorrectly recognized as a plurality of short-sounding text units (for example, housetop is recognized as how step), or a plurality of short-sounding text units may be incorrectly recognized as a long-sounding text unit, a preset mask may be randomly discarded or added in each tag group with a certain probability (for example, 50%) in the process of context feature information extraction to ensure that the output length is not limited by the input length.

In an embodiment of the present disclosure, acquiring the pronunciation feature information of the target text unit in the first speech recognition result includes: acquiring a first phoneme set of the target text unit; and acquiring the pronunciation feature information of the target text unit based on the first phoneme set.

Specifically, the phonemes of each target text unit in the first speech recognition result may be extracted. Generally speaking, a text unit may be split into a plurality of phonemes, and the plurality of phonemes are arranged in the order of pronunciation. Here, the set formed by these phonemes is referred to as the first phoneme set, and the pronunciation feature information of the target text unit may be acquired based on the first phoneme set of each target text unit.

According to the difference in languages, different extraction tools may be used to extract phonemes from text units.

Further, acquiring the pronunciation feature information of the target text unit based on the first phoneme set, includes: using the phonemes in the first phoneme set as the pronunciation feature information of the target text unit; or deleting or replacing at least one phoneme in the first phoneme set to obtain a second phoneme set, and using the phonemes in the second phoneme set as the pronunciation feature information of the target text unit.

Specifically, each phoneme in the first phoneme set of each target text unit may be used as the pronunciation feature information of the target text unit. On the other hand, in order to take into account the pronunciation errors caused by different errors, the present disclosure uses methods such as prior knowledge of pronunciation, error statistics and so on in the process of acquiring pronunciation feature information to perform processing on the first phoneme set of the target text unit (for example, randomly replace a certain phoneme in the set with a phoneme similar to its pronunciation, or randomly delete some phonemes, deleting some phonemes may also be understood as replacing the phoneme with an empty phoneme), while retaining the main pronunciation features of the target text unit, the pronunciation of the word is obscured, and then the corresponding second phoneme set is obtained, and each phoneme in the second phoneme set is used as the pronunciation feature information of the corresponding target text unit.

For example, taking English as an example, the English word phoneme finding tool G2P (Grapheme-to-Phoneme, word to phoneme) is used to find the phonemes of the marked word (e.g., the target text unit) to obtain the corresponding first phoneme set. Then, the word phonemes is added noise by utilizing methods such as pronunciation knowledge, error statistics and so on, while retaining the main pronunciation features of the word, the pronunciation of the word is obscured, that is, the corresponding second phoneme set is obtained.

Specifically, the phoneme information vector matrix $E_p$ is firstly established, and assuming that the corresponding phoneme is represented by an information vector. Likewise, suppose that the information vector set of the phoneme in the i-th tag group (e.g., the target text unit) is denoted as $P_i=(p_{i0}, p_{i1}, \ldots)$ (i.e. the first phoneme set). After the separator information vector s is added, the pronunciation features information may be denoted as: $P=f^{concat}(P_0, s, P_1, s, \ldots, P_m)$, where m is the number of target text units. Then, the sine and cosine position encoding may be used to add relative position information to the pronunciation feature information. The pronunciation feature information after adding the location information will be used as, that is, used as the pronunciation feature information extraction result.

Further, in order to avoid the embodiments being excessively dependent on pronunciation features, in the training phase, noise addition processing may be performed on the pronunciation feature information to enhance the utilization of context feature information. Firstly, a similarity matrix S of a phoneme is establish, where $S_{ij}$ represents the similarity between the i-th phoneme and the j-th phoneme, and $S\_ii=1$, $S_{ij}=S_{ji}$. Then, the transition probability matrix T of a phoneme is calculated according to the similarity matrix:

$$T_{ij} = \frac{S_{ij}}{\sum_{j=0}^{|V_p|} S_{ij}} \tag{9}$$

Here, $|V_p|$ is the total number of phonemes.

After obtaining the transition probability matrix T, at least one of the following solutions may be used to add noise to the phonemes of each tag group, that is, to add noise to the phonemes in the first phoneme set of each target text unit, and then obtain a second phoneme set:

(1) With the fifth probability (such as 50%), keep the phonemes in the first phoneme set unchanged;
(2) With the sixth probability (such as 0.1%), add any random phoneme at any position;
(3) With the seventh probability (such as 0.1%), discard any phoneme at any position;
(4) For any phoneme, keep unchanged with the eighth probability (such as 50%), otherwise, use the transition probability matrix T to change it into any phoneme.

The fifth probability, the sixth probability, the seventh probability, and the eighth probability may be set according to actual requirements (e.g., predetermined values set by a user).

In an embodiment, acquiring a second speech recognition result of the speech to be recognized based on the context information and pronunciation feature information includes: acquiring a corresponding fusion information based on the context information and pronunciation feature information; acquiring a predicted text of the target text unit based on the fusion information; and replacing the target text unit in the first speech recognition result with the predicted text to obtain the second speech recognition result.

Information fusion technology may be used to fuse the context information and the pronunciation feature information of each target text unit. Specifically, the above-mentioned information fusion may be based on the combination of one or more of cyclic neural networks, convolutional neural networks, attention mechanism networks, and so on.

Specifically, after fusing the context information and the pronunciation feature information of each target text unit, the fusion information is decoded to obtain the predicted text corresponding to each target text unit, and the predicted text is the correct text after correcting the target text unit. Then, the corresponding target text unit in the first speech recognition result is replaced with the predicted text obtained after the correction, and the corrected text sequence is obtained, which is the second speech recognition result.

In an embodiment, the acquiring the corresponding fusion information based on the context information and pronunciation feature information includes: with a multi-head co-attention mechanism network, using the pronunciation feature information as a query, using the context information as a key and value, and fusing the pronunciation feature information with the context information to obtain the fusion information.

Specifically, the attention mechanism network may be used to fuse the context information and pronunciation feature information of each target text unit.

Specifically, with a multi-head co-attention mechanism network, using the pronunciation feature information P as a query, using the context information C as a key and value, the two parts of information are fused to obtain fusion information. The calculation formula of the fusion information F is:

$$F = softmax\left(\frac{(PW^Q)(CW^K)^T}{\sqrt{d}}\right)(CW^V) \qquad (10)$$

Here, d is the information feature dimension, $W^Q$, $W^K$, and $W^V$ are trainable model parameters.

Then, a feedforward neural network may be added behind the multi-head co-attention mechanism network to further integrate the fusion information. Wherein, the output of each network has been added a residual mechanism and a normalization mechanism.

In an embodiment, the acquiring the predicted text of the target text unit based on the fusion information includes decoding the fusion information to obtain the predicted text of the target text unit.

Specifically, decoding the fusion information to obtain a predicted text of the target text unit, includes, for the current target text unit, the fusion information is decoded based on the predicted text of the previous target text unit to obtain the predicted text of the current target text unit.

Specifically, the working mode of decoding the fusion information may adopt the self-loop decoding mode, and the input of each cycle is the output of the previous cycle (that is, the predicted text of the previous target text unit) and the fusion information, and the output is the predicted text of the current target text unit. Specifically, the whole decoding process includes a plurality of decoding cycles until a stop decoding condition is encountered, wherein there is included the output of the previous decoding cycle in the input of each decoding cycle. For example, it is specified that the starting decoding input is <s> and the stop decoding condition is <\s>, then the input of the first decoding cycle is <s>, and assuming that the output of the first decoding cycle is A, then the input of the second decoding cycle includes A, the output of the second decoding cycle is B, the input of the third decoding cycle includes B, and the output is C, and so on, until the n-th output is <\s>, then stop decoding. The final decoding result is ABC, where the decoding may adopt a combination of one or more of cyclic neural networks, convolutional neural networks, and attention mechanism networks and so on.

For example, the present disclosure may adopt the decoder in transformer as the decoding module. In self-loop decoding, only the predicted text corresponding to the marked position (e.g., the position at which the target text unit is located) is predicted. Similar to the separation process in the context extraction process, a preset separator may be added between two non-adjacent target text units.

Figure 3A:
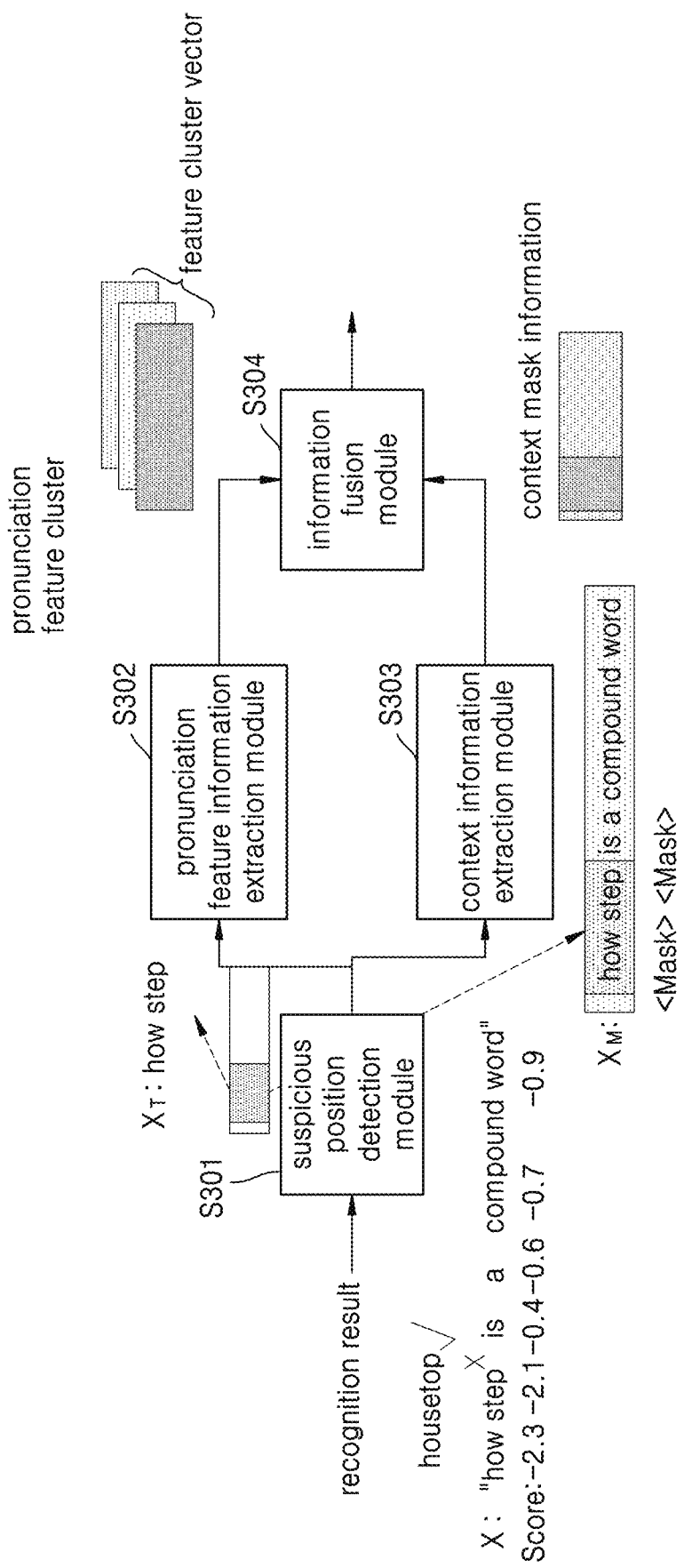
FIG. 3A is a schematic diagram of acquiring fusion information by a mask dual channel fusion module according to an embodiment.

In an embodiment, the above-mentioned pronunciation feature information may be pronunciation features cluster, that is, the pronunciation feature information may contain a plurality of groups of pronunciation features, as shown in FIG. 3A, assuming that the recognition result information of the ASR system $$X=\text{"how}(-2.3) \text{ step}(-2.1) \text{ is}(-0.4) \text{ a}(-0.6) \text{ compound} \\ (-0.7) \text{ word}(-0.9)\text{"} \qquad (11)$$

Here, the word is the recognition result, the number in the brackets is the perplexity information corresponding to each word, and "how step" is the error recognition result. Furthermore, acquiring the fusion information may include the following steps:

Step S301: Use the suspicious position detection module to detect the suspicious position (that is, the target text unit) in the first recognition result.

Step S302: Use the pronunciation feature extraction module, extract the pronunciation information at the suspicious position according to the word form sequence $X_T$="how step" at the suspicious position, establish a pronunciation feature cluster, and vectorize it into a feature cluster vector.

Step S303: Replace the recognition result at the suspicious position with the mask "<MASK>", and the result after the replacement is $X_T$="<MASK><MASK> is a compound word". Use the context information extraction module to extract the context information at the suspicious position based on $X_T$ to obtain the context mask information.

Step S304: Use the information fusion module to fuse the context mask information with the pronunciation feature cluster information to obtain the fused phoneme-context fusion vector (i.e., the vector that pays attention to the pronunciation content, that is, the fusion information).

The above-mentioned mask dual channel mechanism replaces words at suspicious positions with masks, thus avoiding the propagation of errors in the context channel. Further, the mask dual channel fusion module can also expand a phoneme sequence to a plurality of similar phoneme sequences, which contributes to enrich the search space and reduce the recognition errors and error propagation problems caused by accent or pronunciation errors.

Figure 3B:
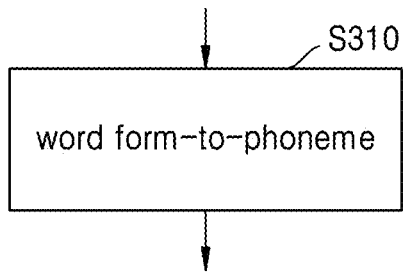
FIG. 3B is a schematic diagram of acquiring pronunciation feature clusters by a pronunciation feature information extraction module according to an embodiment.
Figure 3B:
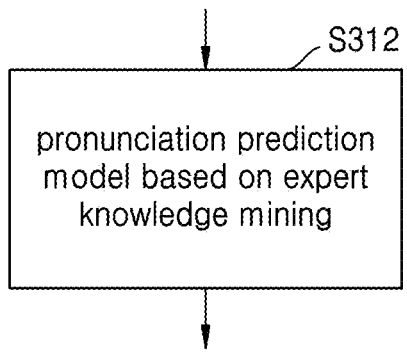
Figure 3B:
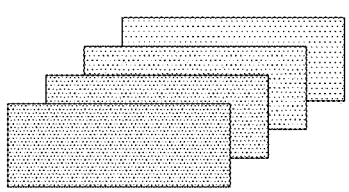

Specifically, as shown in FIG. 3B, acquiring the pronunciation feature cluster vector by the pronunciation feature information extraction module in FIG. 3A may specifically include the following steps:

Step S310: According to the word form-to-phoneme module, convert the word form sequence $X_T$="how step" at the suspicious position into the phoneme sequence $I_x$="HH AW S T EH P".

Step S312: Expand the phoneme sequence $I_x$ by the pronunciation prediction model based on expert knowledge mining to obtain the feature cluster of the phoneme sequence, where the feature cluster contains the correct pronunciation feature at the suspicious position and other phoneme sequence features that are similar to the pronunciation at the suspicious position. The pronunciation prediction model based on expert knowledge mining may calculate the probability of each phoneme in the sampling space, and expand the phoneme sequence into a plurality of similar phoneme sequences, which helps to create more opportunities to find the correct recognition results and may enhance the robustness of the system. Further, the expert knowledge may be used to dynamically prune the unreasonable phonemes in the path to make the generated phonemes more reasonable.

Step S314: Perform vectorization processing on the feature clusters, and convert the feature clusters into feature cluster vectors.

Figure 3C:
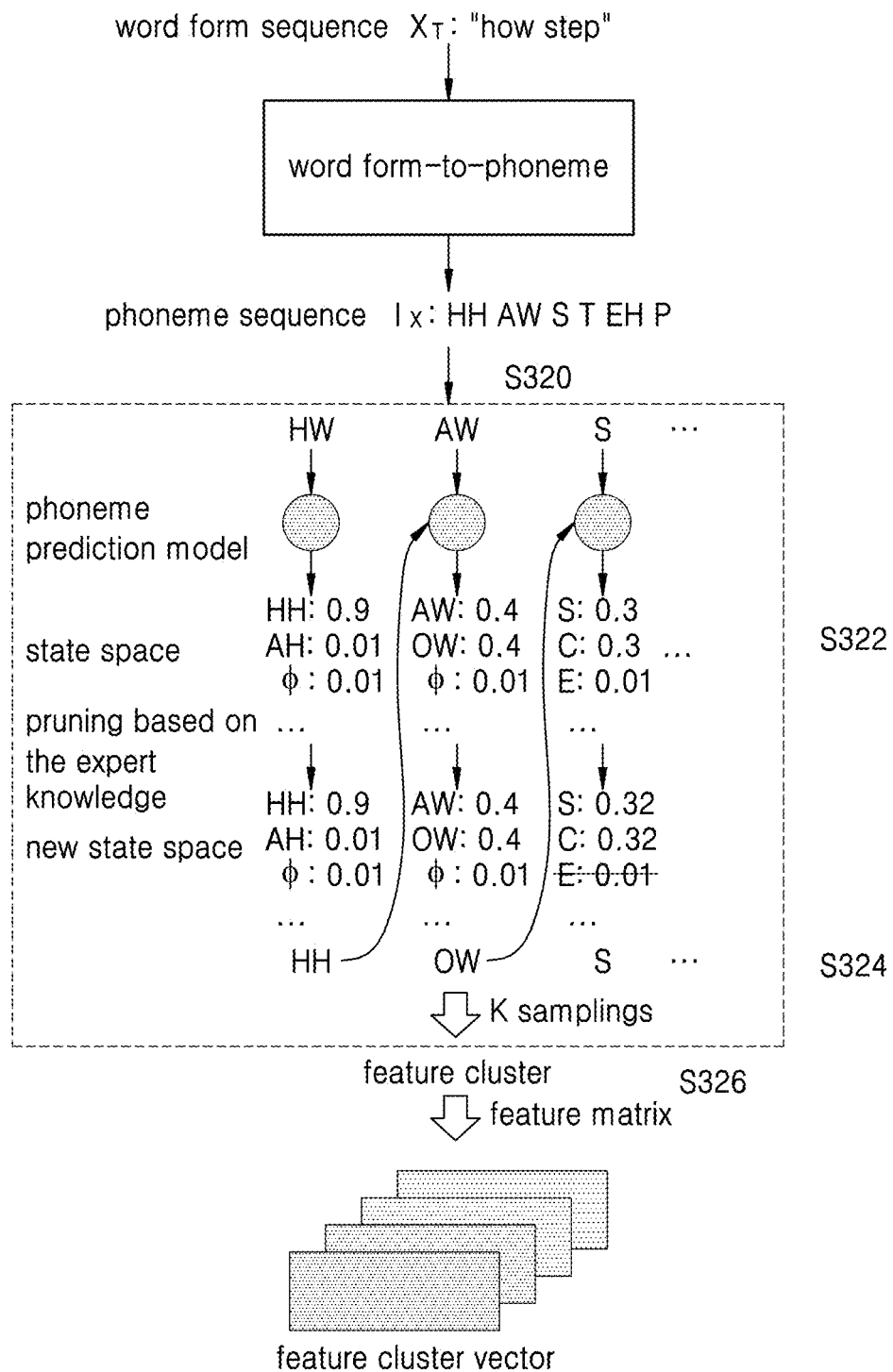
FIG. 3C is a schematic diagram of acquiring pronunciation feature cluster vectors by a pronunciation prediction model based on expert knowledge mining according to an embodiment.

FIG. 3C is a possible pronunciation prediction model based on expert knowledge mining. Acquiring feature cluster vectors through it may specifically include the following steps:

Step S320: For the phoneme sequence $I_x$, input the phoneme sequence to the phoneme prediction model to acquire the replacement phoneme at each phoneme position in the phoneme sequence, that is, acquire the state space of each phoneme in the phoneme sequence. Assuming that the current phoneme is $I_i$, and the previous phoneme that has been selected is $O_{i-1}*$, the probability distribution of similar phonemes is calculated as $P(O_i|I_i, O_{i-1}*)$, that is, $O_i$ is used as the probability of replacement phoneme of $I_i$, where $O_i$ represents the state space, that is, the phoneme set (for example, when $O_{i-1}*$ is "HH", the probability of the current phoneme $I_i$ being "AW" P (AW|AW, HH)=0.4, the model will select "AW" as the phoneme at position i with a probability of 40%, or the probability that the model will select "AW" as the replacement phoneme at position i is 0.4). In addition, if the probability distribution path violates expert knowledge (for example, P (AE|S, OW)=0.2, that is, the probability that "AE" is used as the replacement phoneme of S is 0.2, which is less than the second preset threshold), then this path is ignored (that is, the corresponding phoneme is not replaced). Expert knowledge may be a pre-defined rule by linguistic experts.

Step S322: According to the value of the state space probability $P(O_i|I_i, O_{i-1}*)$, sample the phoneme $O_i*$ at the current position (for example, for "OW", if P (OW|AW, HH)=0.4, the probability that the "OW" is used as the phoneme at position i is 40%);

Step S324: For position i=0, use $P(O_0|I_0)$ to sample $O_0*$;

Step S326: Repeat sampling K times to obtain K feature clusters. Where K is related to the input phoneme length input_length, and may take K=5*input_length.

In the pronunciation prediction model based on expert knowledge mining in the embodiments of the present application, the replacement probability (probability of replacing the current phoneme) corresponding to each phoneme is calculated based on the previously sampled phonemes (may also be called the sampled phonemes) and the current phoneme, the unreasonable paths are pruned according to the expert knowledge (phonemes are filtered/screened according to the abovementioned replacement probability), and similar phonemes are extracted according to the above-mentioned replacement probability after pruning (selects the phoneme that replaces the current phoneme according to the replacement probability).

Figure 3D:
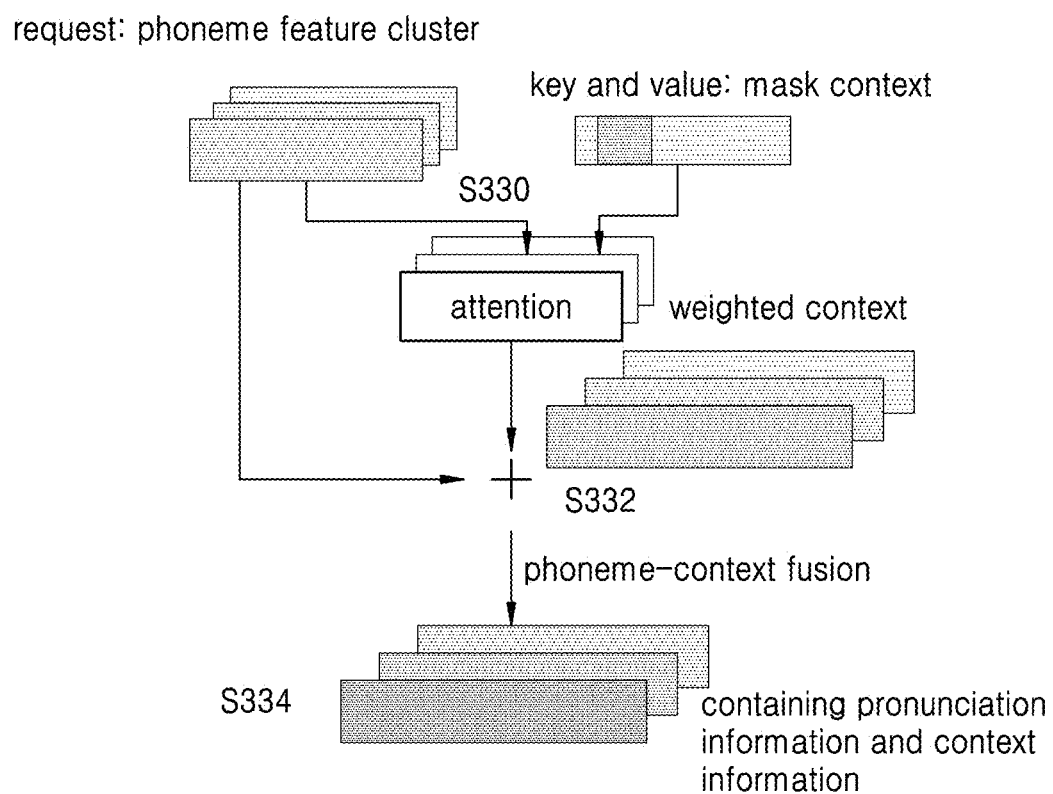
FIG. 3D is a schematic diagram of acquiring fusion information by an information fusion module according to an embodiment.

Specifically, as shown in FIG. 3D, acquiring the fusion information through the information fusion module in FIG. 3A may specifically include the following steps:

Step S330: For a group of phoneme features in the phoneme feature cluster, as a query, use the mask context information as a key and value, and perform the attention calculation operation to obtain the context attention information (corresponding to the weighted context information in the figure);

Step S332: Add the query and the attention information to obtain the final phoneme-context fusion information. This fusion information will contain the pronunciation information and context information of the mask.

Step S334: For each group of phoneme features in the phoneme feature cluster, repeat the above-mentioned steps, and finally obtain a phoneme-context fusion information cluster.

The above-mentioned information fusion module of the embodiment of the present disclosure may find the most important context information according to the corresponding pronunciation, which helps to correct the words in which an error is recognized based on the truly relevant words, and improves the accuracy of the correction.

Figure 3E:
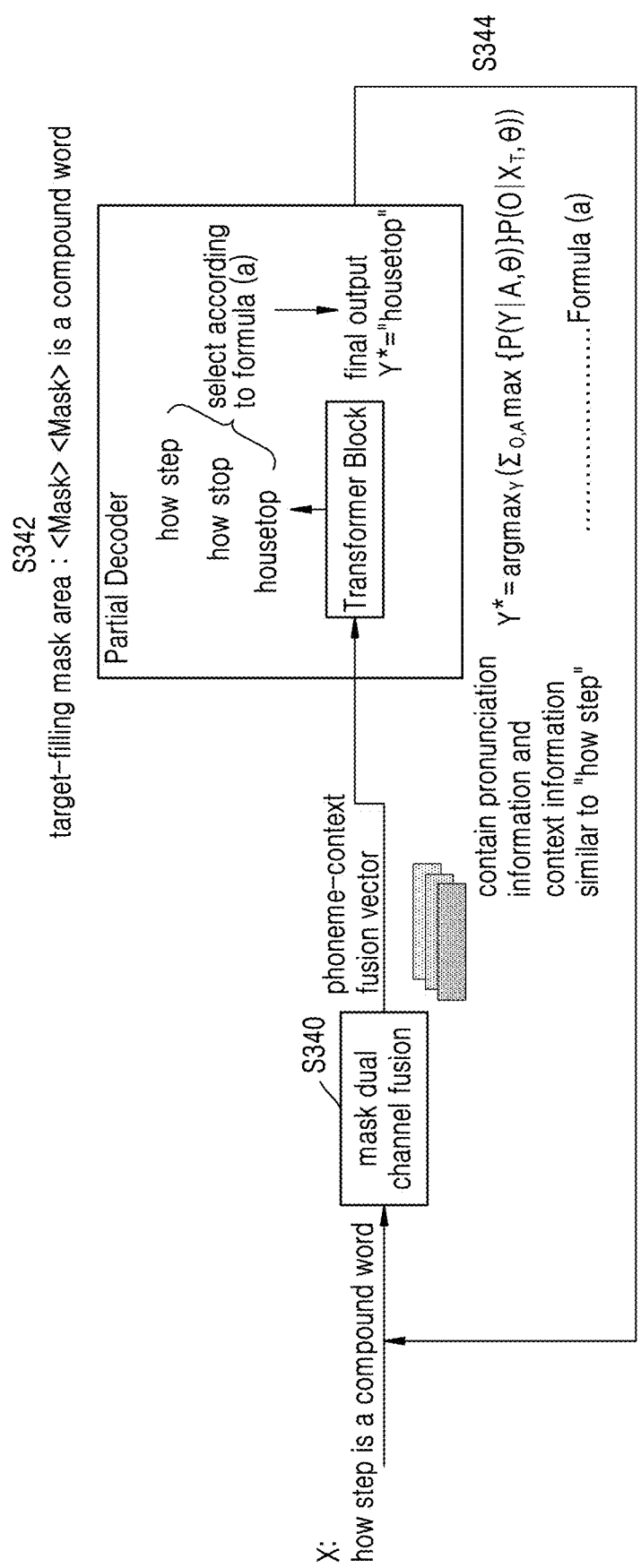
FIG. 3E is a schematic diagram of decoding fusion information by a decoding module according to an embodiment.
Figure 3F:
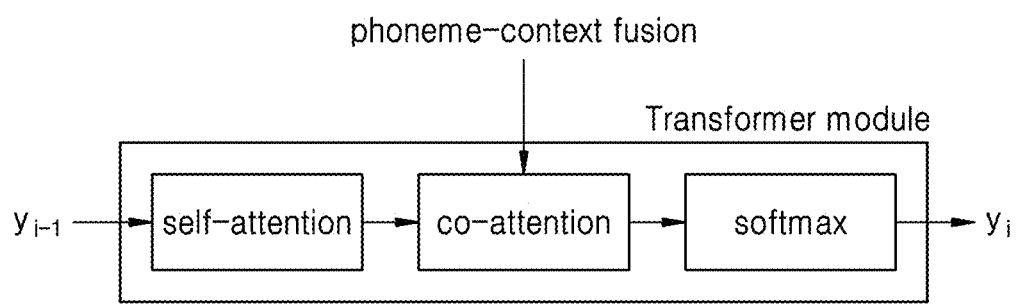
FIG. 3F is a schematic diagram of calculating a word sequence score according to an embodiment.
Figure 3G:
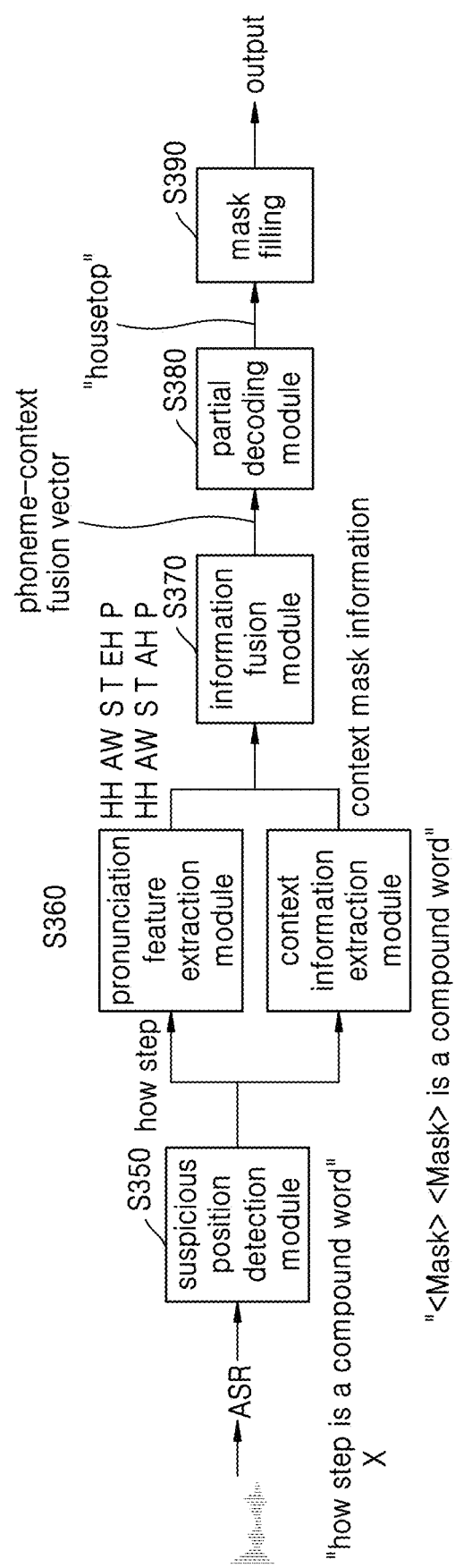
FIG. 3G is a schematic diagram of speech recognition according to an embodiment.
Figure 3H:
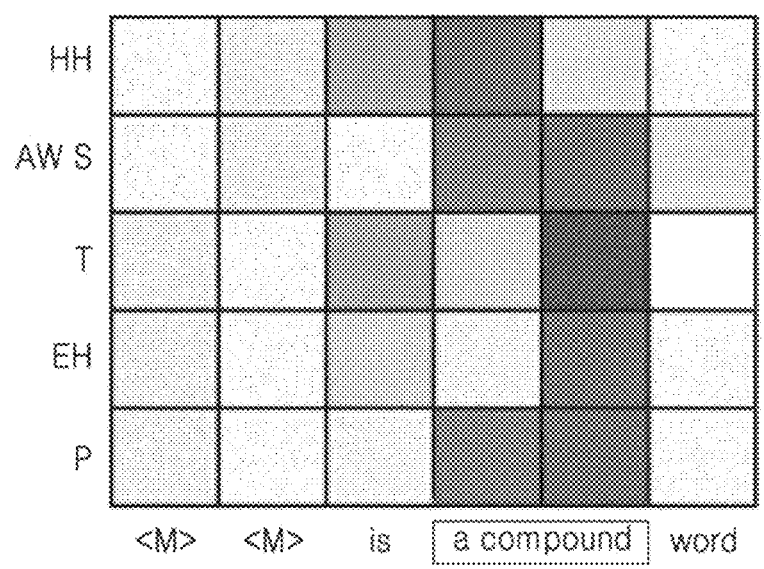
FIG. 3H is a schematic diagram of phoneme-context fusion information according to an embodiment.

As shown in FIG. 3H, the information fusion module may find an important context information in words other than the position where an error is recognized. FIG. 3H shows an example of phoneme-context fusion information. Each cell represents the importance of the context information of the abscissa versus the phoneme information of the ordinate, for example, a cell (HH, compound) indicates the importance of "compound" to "HH".

Specifically, as shown in FIG. 3E, acquiring the fusion information through a partial decoding module in FIG. 3A may specifically include the following steps:

Step S340: For one fusion information in the fusion information cluster, input the fusion information to the decoding module.

Step S342: In the decoding module, only the result of the mask part is predicted (for "<MASK><MASK> is a compound word", the traditional decoding module will predict the whole sentence "housetop is a compound word", while this decoding module only predict "housetop", that is, the mask part);

Step S344: For each fusion information in the fusion information cluster, repeat the above-mentioned steps to obtain the prediction results of all mask parts, and then use the information such as a word sequence score, a pronunciation sequence score and so on to select the final model output. The selection output formula is as follows:

$$Y^* = \text{argmax}_Y(\Sigma_{O,A} \max\{P(Y|A,\theta)\}P(O|X_T,\theta)) \quad (12)$$

Here, $P(Y|A, \theta)$ is the word sequence score, $P(O|X_T, \theta)$ is the pronunciation sequence score, $\theta$ is the model parameter, and A is the phoneme-context fusion information feature.

Further, a further description of the selection output formula is as follows:

1. For each pronunciation sequence O, the pronunciation sequence score is calculated according to the suspicious area and the pronunciation prediction model. For example, when calculating the pronunciation sequence O=HH AW S T AH P, when $X_T$="how step", the knowledge-based phoneme model (pronunciation prediction model based on expert knowledge mining) is used to calculate the probability of each phoneme $P(O_i|I_i, O_{i-1}*)$, and then the probabilities of all phonemes are added to obtain the pronunciation sequence score P(O=HH AW S T AH P|$X_T$=how step, $\theta$).

2. For each phoneme-context fusion information A, the Transformer module (as shown in FIG. 3F) is used to calculate the word sequence score $P(Y|A, \theta)$ of each sequence, and then the highest score $\max\{P(Y|A, \theta)\}$ is picked as the final word sequence score.

3. For each pronunciation sequence O and the corresponding phoneme-context fusion information A, the word sequence score and the pronunciation sequence score are multiplied as their final scores.

4. Certain rules are used to determine the final best output Y. For example, the highest score is used as the selection rule.

In the transformer module, for a word sequence Y and its corresponding phoneme-context fusion information A, the steps of predicting the i-th word $y_i$ according to the i−1th word $y_{i-1}$ are as follows:

1. $y_{i-1}$ is input to the self-attention layer to obtain the self-attention vector;

2. The self-attention vector and phoneme-context fusion information are input to the co-attention layer to obtain the co-attention vector;

3. The i-th word $y_i$ is obtained through the softmax layer.

In the above-mentioned partial decoding module of the embodiment of the disclosure, for each pronunciation sequence (O), decoding prediction is performed word by word based on the previous word (such as $y_{i-1}$) and phoneme-context fusion information, as well as special tags (such as <M>), for example, the special tag <M> is given as $y_0$, the predicted word $y_1$ may be "housetop". According to $y_1$ and phoneme-context fusion information, the prediction $y_2$ may be "<\s>", which is an end tag. After the end tag is detected, the prediction may be ended, and the output Y is "<M> housetop <\s>".

The partial decoding module according to an embodiment acquires the phoneme-context fusion information from the information fusion module, and inputs the phoneme-context fusion information to the transformer module, and may generate a plurality of candidate texts of the target text unit. Because partial decoding does not need to generate candidate texts of whole sentences, only the candidate text of the target text unit needs to be generated, so the decoding speed will be much faster. The final corrected text is selected by comprehensively considering the word sequence score and the pronunciation sequence score, which improves the accuracy of the recognition result.

After integrating the above steps, as shown in FIG. 3G, a segment of audio is recognized by the ASR (Automatic Speech Recognition) system, and "how step is a compound word" is output, where "how step" is the wrong recognition result. The overall recognition result detects the wrong position through the suspicious position detection module (S350); then uses the pronunciation feature extraction module to extract the pronunciation feature (pronunciation feature of "how step") of the wrong position, at the same time mask the suspicious position and use the context information extraction module to extract context mask information (S360); use the information fusion module to fuse the two parts of information to obtain the phoneme-context fusion vector (S370); re-predict the output of the suspicious position ("how step" is re-predicted as "housetop") through the partial decoding module (S380); and, the re-predicted output is filled in the suspicious position through the mask filling to obtain the final output ("housetop is a compound word") (S390).

The speech recognition method provided in the embodiments of the disclosure may be applied to smart terminals (such as mobile phones), smart home equipment, automobiles, smart headphones, and the like.

For example, for the applications that need to use speech recognition function provided in the above-mentioned smart terminals (such as mobile phones), smart home equipment, cars, smart headsets and so on, such as speech assistants, the embodiments of the present disclosure may provide error correction solution for the speech recognition functions in the speech assistant. Specifically, the accurate content corresponding to the user's speech should be "where is Enlo Hospital?", the wrong recognition result "where is in to hospital?" may be obtained through the speech recognition system. The wrong recognition result may be corrected through the embodiment of the disclosure to obtain the correct sentence: "where is enlo hospital", and then input it to the semantic understanding module of the speech assistant. In the dictation function of a smart terminal (such as mobile phones), the embodiment of the disclosure may also be used to correct the speech recognition result. For example, if the user says "I like Jay Chou's mojito", the dictation function may misrecognize this segment of speech as "I like chou jay demo hit". After the bilingual mixed recognition, "I like Jay Chou demo hit" is obtained, and then the error correction module is used to obtain the correct sentence.

Figure 4:
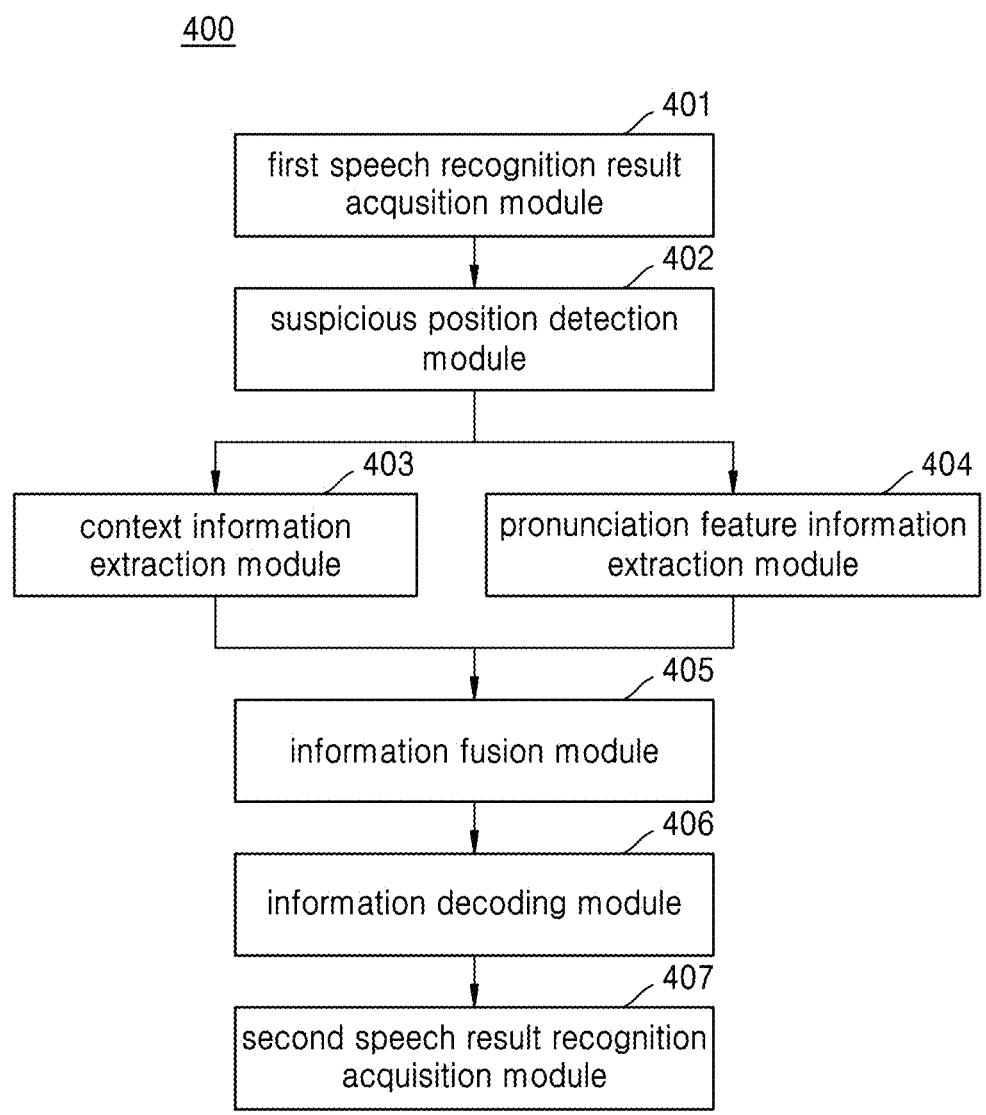
FIG. 4 is a block diagram illustrating a speech recognition system according to an embodiment.

According to an embodiment, the speech recognition method may be implemented by a speech recognition system 400 as shown in FIG. 4. The speech recognition system may mainly include: a first speech recognition result acquisition module 401, a suspicious position detection module (Suspicious Position Detection, SPD) 402, a context information extraction module 403, a pronunciation feature information extraction module 404, an information fusion module 405, an information decoding module 406, and a second speech result recognition acquisition module 407. The first speech recognition result acquisition module 401 may be any existing speech recognition system, which is used to perform initial recognition on the speech to be recognized to obtain an initial text sequence, and then input the initial text sequence to the suspicious position detection module 402. The suspicious position detection module 402 marks the target text unit in the initial text sequence based on obtaining the input text sequence marked with the target text unit. Next, the input text sequence is input to the context information extraction module 403, the corresponding context text sequence is output, each target text unit in the input text sequence is input to the pronunciation feature information extraction module 404, the corresponding pronunciation feature information is output, and the context text sequence and pronunciation feature information are input to the information fusion module 405, and the context information and the pronunciation feature information are information fused in the information fusion module 405, and the corresponding fusion information is output. The output fusion information is then input to the information decoding module 406, and the information decoding module 406 outputs the predicted text corresponding to each target text unit after decoding the output fusion information. The output predicted text is input to the second speech recognition result acquisition module 407, and the corresponding target text unit is replaced in the second speech recognition result 407, and the corrected second speech recognition result is output.

Figure 5A:
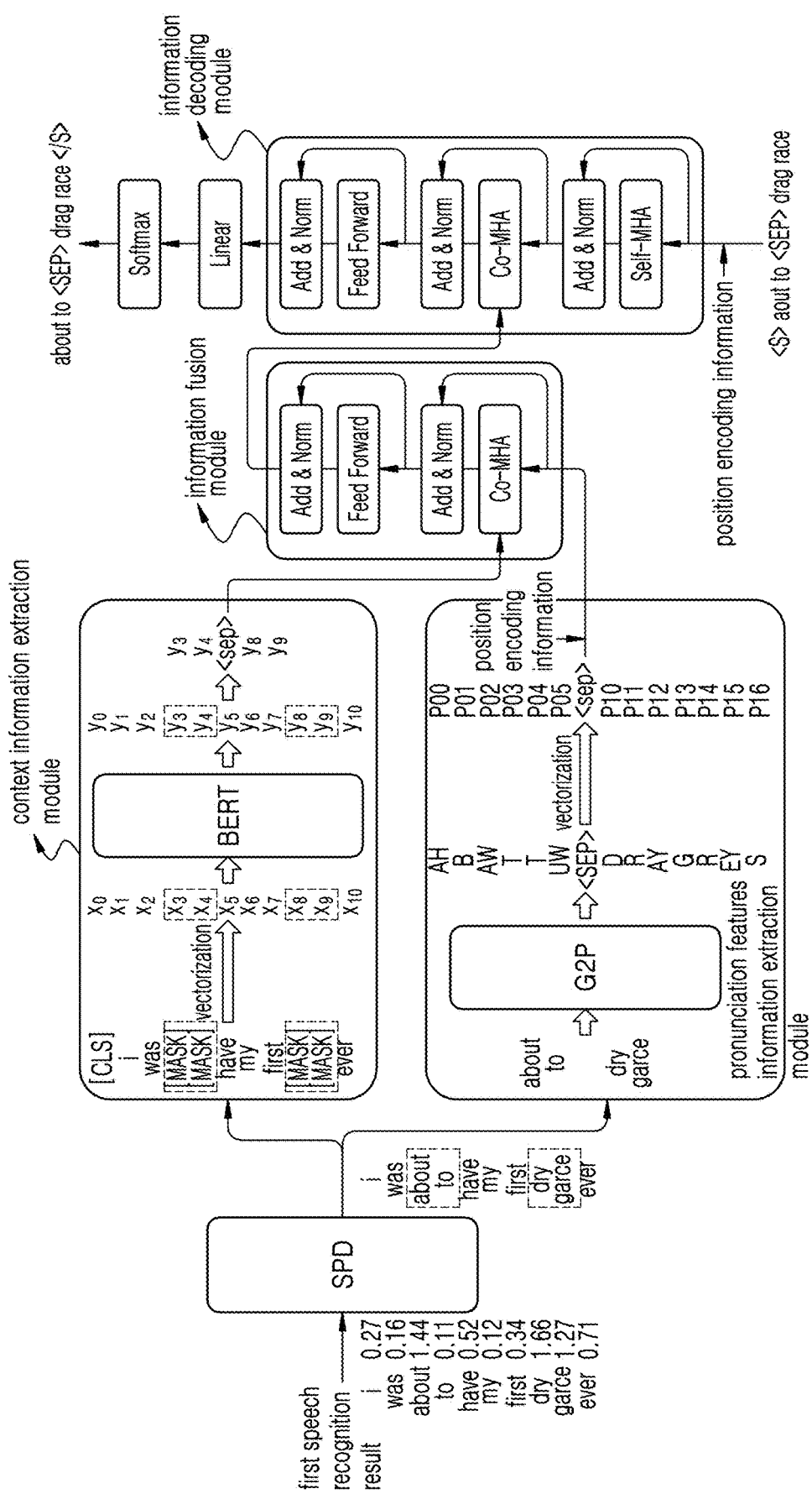
FIG. 5A is a schematic diagram illustrating a specific flow of a speech recognition method according to an embodiment.

The one or more embodiments are explained by way of an example below. As shown in FIG. 5A, in the speech recognition system, a certain first speech recognition result is "i was about to have my first dry grace ever", wherein the perplexity corresponding to each text unit is "0.27, 0.16, 1.44, 0.11, 0.52, 0.12, 0.34, 1.66, 1.27, 0.71" respectively, and the first preset threshold is 1.30. Through the suspicious position detection module (SPD), based on the above-mentioned perplexity and the first preset threshold, the target text units in the initial text sequence are marked as "about to" and "dry grace" respectively. The target text unit in the text sequence marked with the target text unit are then replaced with the preset mask [MASK], that is, to obtain the input text sequence "i was [MASK] [MASK] have my first [MASK] [MASK] ever." For the BERT model, one may add a recognition label [CLS] in front of it, then the input text sequence becomes "[CLS] i was [MASK] [MASK] have my first [MASK] [MASK] ever", which is then converted into the input "$x_0$ $x_1$ $x_2$ $x_3$ $x_4$ $x_5$ $x_6$ $x_7$ $x_8$ $x_9$ $x_{10}$" of the BERT model by embedding, and the corresponding context text sequence "$y_0$ $y_1$ $y_2$ $y_3$ $y_4$ $y_5$ $y_6$ $y_7$ $y_8$ $y_9$ $y_{10}$" is output after inputting to the BERT model, thus acquiring the context information "$y_3$ $y_4$" and "$y_8$ $y_9$" corresponding to the position where the target text unit is located at, and finally obtaining that the context information corresponding to the input text sequence is "$y_3\ y_4$<sep>$y_8\ y_9$" by separating and connecting with the preset separator <sep>. Meanwhile, the two target text units "about to" and "dry grace" are input to the pronunciation feature information extraction module, and the corresponding phoneme sets of the two target text units are searched through G2P as "AH B AW T T UW<sep>D R AY G R EY S". The Embedding is performed on the phoneme set to obtain the corresponding pronunciation feature information "$p_{00}\ p_{01}\ p_{02}\ p_{03}\ p_{04}\ p_{05}$<sep>$p_{10}\ p_{11}\ p_{12}\ p_{13}\ p_{14}\ p_{15}\ p_{16}$". Then the context information "$y_3\ y_4$<sep>$y_8\ y_9$" and the pronunciation feature information "$p_{00}\ p_{01}\ p_{02}\ p_{03}\ p_{04}\ p_{05}$<sep>$p_{10}\ p_{11}\ p_{12}\ p_{13}\ p_{14}\ p_{15}\ p_{16}$" are input to the information fusion module (wherein, position encoding information is added to pronunciation feature information before inputting), the fusion information is output, and finally the fusion information is input to the information decoding module. The predicted text of the output target text unit "about to" is "about to", and the predicted text of "dry grace" is "drag race". In addition, it may be known from the foregoing description that the entire decoding process includes a plurality of decoding cycles until the stop decoding condition is encountered. Therefore, the start label <S> and the stop label <\S> may be added to the first position of the fusion information to provide a start condition and a stop condition for cyclical decoding process. Finally, the predicted text is used to replace the corresponding target text unit, and the resulting second speech recognition result is "i was about to have my first drag race ever".

Figure 5B:
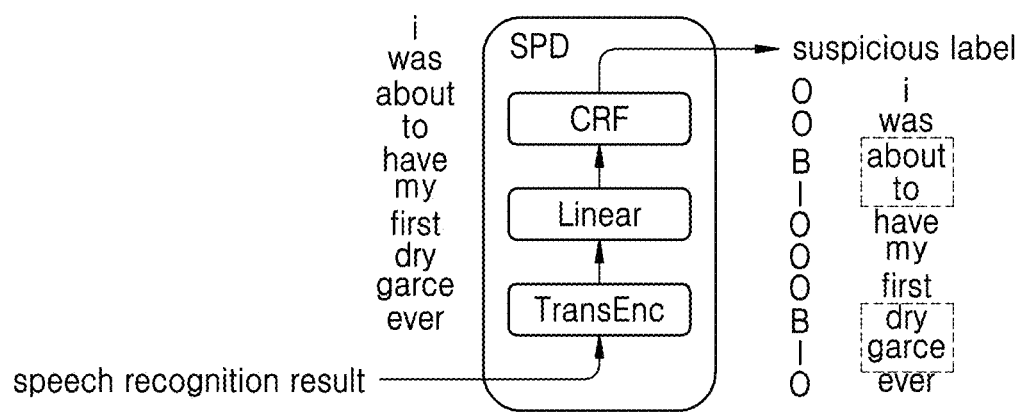
FIG. 5B is a schematic diagram of suspicious position detection according to an embodiment.

When the perplexity corresponding to the text unit cannot be acquired, the suspicious position detection module may use the existing label prediction model to replace it, as shown in FIG. 5B. For the convenience of presentation, the speech recognition result is marked as R (i.e. the corresponding "i was about to have my first dry grace ever"), and the specific process is as follows:

1. Use Transformer's encoding module (i.e. TransEnc in the figure) to encode the speech recognition result to obtain the encoded information H:

$$H = \text{TransEnc}(R) \quad (13)$$

2. Use the linear network (i.e. Linear in the figure) to extract the encoded information to obtain the logit information L of the label:

$$L = W_l H + b \quad (14)$$

Here, $W_l$ and b are trainable parameters.

3. Use the Conditional Random Field model (CRF in the figure) to decode the logit information of the label to obtain the suspicious label G corresponding to the text unit:

$$G = \text{CRF}(L, W_{crf}) \quad (15)$$

Wherein, $W_{crf}$ is a trainable parameter. According to the speech recognition result in the example, finally, the suspicious label G is predicted as "O O B I O O O B I O O". Here, "O" means that this text unit is not suspicious, "B" and "I" mean that this text unit is suspicious.

4. Use the suspicious label to mark the target text units in the initial text sequence as "about to" and "dry grace" respectively.

Specifically, in the information fusion module, the multi-head co-attention mechanism network (i.e. Co-MHA in the figure) is used, and the pronunciation feature information C is used as the query (position encoding information is added before the input), and the context information P is used as a key and value. The two parts of information are fused, and a feedforward neural network (i.e., Feed Forward in the figure) is added after the multi-head co-attention mechanism network to further integrate the fusion information to obtain the fusion information. The output of each network in the information fusion module is added with a residual mechanism and a normalization mechanism (i.e. Add & Norm in the figure). In the information decoding module, for each self-loop decoding process, the positional coding information is firstly added to the input decoder, and is then input into the multi-head self-attention mechanism network (e.g., Self-MHA in FIG. 5A) to obtain self-attention information. The self-attention information is used as the query, and the fusion information is used as the key and value, and is input into the multi-head co-attention mechanism network. The feedforward neural network is also added later to further integrate the information. And, the output of each network also adds a residual mechanism and a normalization mechanism. Finally, the linear network (e.g., Linear in FIG. 5A) is used to extract the integrated information, and the softmax network is used to give the probability of each word in the vocabulary, and select the word with the highest probability as the final output, that is, to obtain the predicted text of each target text unit.

It should be explained that the information fusion module and the information decoding module in FIG. 5A only show a processing process of one information fusion and information decoding. In practical applications, the information fusion module may be composed of a plurality of information fusion modules superimposed in series as shown in FIG. 5A. That is, the output processed by the previous information fusion module is used as the input of the next information fusion module, and so on, until the last information fusion module completes processing and outputs the final fusion information; likely, the information decoding module may also be composed of a plurality of information decoding modules superimposed in series as shown in FIG. 5A. That is, the output processed by the previous information decoding module is used as the input of the next information decoding module, and so on, until the last information decoding result completes processing and outputs the final decoding module.

Figure 6A:
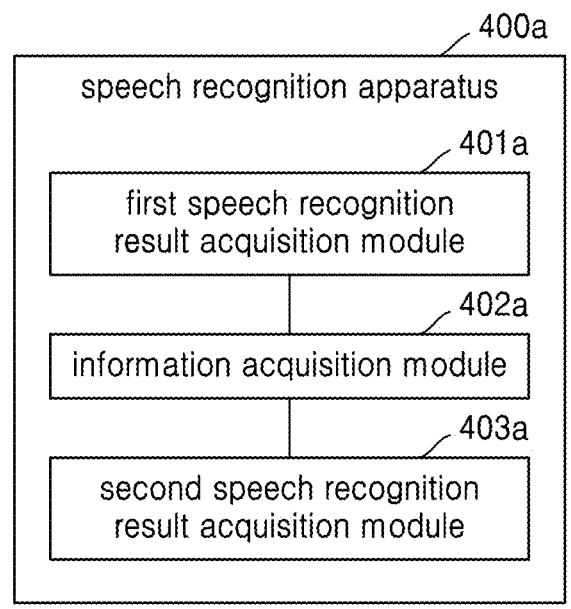
FIG. 6A is a structural block diagram of a speech recognition apparatus according to an embodiment.

FIG. 6A is a block diagram of structure of a speech recognition apparatus 400a according to an embodiment. As shown in FIG. 6A, the apparatus 400a may include a first speech recognition result acquisition module 401a, an information acquisition module 402a, and a second speech recognition result acquisition module 403a.

The first speech recognition result acquisition module 401a is used to acquire the first speech recognition result of the speech to be recognized.

The information acquisition module 402a is used to acquire the context information and pronunciation feature information of the target text unit in the first speech recognition result.

The second speech recognition result acquisition module 403a is used to acquire the second speech recognition result of the speech to be recognized based on the context information and the pronunciation feature information.

The speech recognition apparatus 400a corrects the corresponding target text unit by acquiring the context information and the pronunciation feature information of the target text unit that needs to be corrected in the first speech recognition result of the speech to be recognized, and combining the context information and the pronunciation feature information. A second speech recognition result is obtained after the correction. Because the context information and the pronunciation feature information of the target text unit are combined, more error types may be covered in the correction process, and the accuracy of the correction result is improved.

In an embodiment, the apparatus may further include a target text unit determination module configured to: acquire a perplexity of the text unit in the first speech recognition result; and determine the target text unit based on the perplexity.

The target text unit determination module may be further configured to: determine the first text unit having a perplexity not less than the first preset threshold as the target text unit; or acquire a corresponding second text unit based on the first text unit and at least one text unit before and/or after the first text unit, and determine the second text unit as the target text unit.

The information acquisition module is configured to: replace the target text unit in the first speech recognition result with a preset mask to obtain a corresponding input text sequence; and acquire the context information corresponding to the target text unit based on the input text sequence.

The information acquisition module is further configured to: acquire a first phoneme set of the target text unit; and acquire the pronunciation feature information of the target text unit based on the first phoneme set.

The information acquisition module is further configured to: use the phonemes in the first phoneme set as the pronunciation feature information of the target text unit; or replace at least one phoneme in the first phoneme set to obtain a second phoneme set, and use the phonemes in the second phoneme set as the pronunciation feature information of the target text unit.

The information acquisition module is further configured to: based on a preset rule, acquire at least one candidate replacement phoneme of the phonemes in the first phoneme set and the probability that the candidate replacement phoneme is used as the replacement phoneme of the corresponding phoneme; and replace the corresponding phoneme with at least one candidate replacement phoneme having a probability not less than the second preset threshold to obtain the corresponding second phoneme set.

In an embodiment, the second speech recognition result acquisition module includes an information fusion sub-module, a predicted text acquisition sub-module, and a second speech recognition result acquisition sub-module.

The information fusion sub-module is configured to acquire a corresponding fusion information based on a context information and a pronunciation feature information.

The predictive text acquisition sub-module is configured to acquire the predictive text of the target text unit based on the fusion information.

The second speech recognition result acquisition sub-module is configured to replace the target text unit in the first speech recognition result with the predicted text to obtain the second speech recognition result.

In an embodiment, the information fusion sub-module is configured to: with a multi-head co-attention mechanism network, use the pronunciation feature information as a query, use the context information as a key and value, and fuse the pronunciation feature information with the context information to obtain the fusion information.

The predictive text acquisition sub-module is further configured to: decode the fusion information to obtain the predicted text of the target text unit.

The predictive text acquisition sub-module is further configured to: for the current target text unit, decode the fusion information based on the predicted text of the previous target text unit to obtain the predicted text of the current target text unit.

The first speech recognition result acquisition module is further configured to: acquire a speech to be recognized containing at least two languages, and acquire at least one candidate speech recognition result for each language; acquire a word lattice corresponding to each language based on at least one candidate speech recognition result; and perform path searching in the word lattice corresponding to each language, and use the text sequence corresponding to the optimal path as the first speech recognition result.

The first speech recognition result acquisition module is further configured to: acquire the start time interval and the end time interval of the text unit in the at least one candidate speech recognition results, and acquire the longest common subsequence corresponding to the at least one candidate speech recognition results; acquire a word lattice corresponding to each language, based on the start time interval and the end time interval of the text unit, as well as the longest common subsequence.

The first speech recognition result acquisition module is further configured to: acquire the sequence of text units based on the start time interval and the end time interval of the text unit in the word lattice corresponding to each language; perform path searching based on the sequence to obtain the first path set; skip any text unit in the first paths by a preset number of text units and connect with a next text unit to obtain a second path set.

The first speech recognition result acquisition module is configured to: acquire the speech to be recognized containing at least two languages; encode respectively for each language to obtain corresponding speech features; and perform decoding based on a speech feature corresponding to each language respectively and a text information feature of the speech to be recognized to obtain a first speech recognition result of the speech to be recognized.

The first speech recognition result acquisition module is further configured to: with the multi-head co-attention mechanism network, use the text information feature as the query, use the speech feature corresponding to each language as the key and value, to acquire the first decoding feature corresponding to each language; perform linear classification on each first decoding feature to obtain a weight coefficient of each first decoding feature; and acquire a first speech recognition result based on each first decoding feature and the corresponding weight coefficient.

The first speech recognition result acquisition module is further configured to: acquire a second decoding feature of the speech to be recognized based on each first decoding feature and the corresponding weight coefficient; acquire the language classification feature of the speech to be recognized based on the second decoding feature; concatenate the second decoding feature and the language classification feature, and acquire the first speech recognition result based on the concatenating result.

Figure 6B:
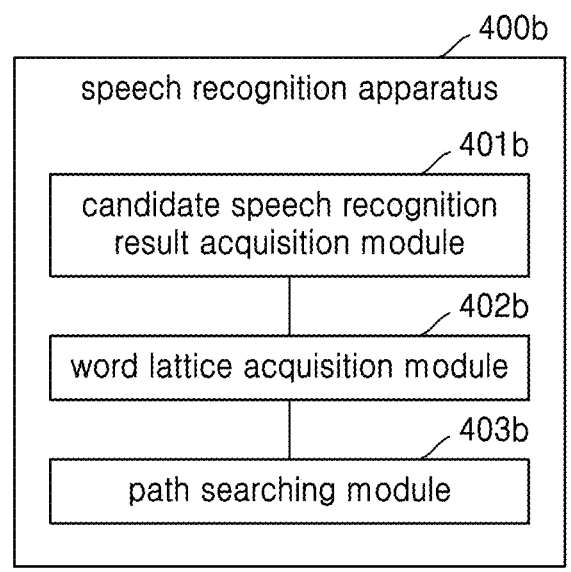
FIG. 6B is a block diagram of a speech recognition apparatus according to another embodiment.

FIG. 6B is a block diagram of structure of a speech recognition apparatus 400b according to an embodiment. As shown in FIG. 6B, the apparatus 400b may include a candidate speech recognition result acquisition module 401b, a word lattice acquisition module 402b, and a path searching module 403b.

The candidate speech recognition result acquisition module 401b is configured to acquire a speech to be recognized containing at least two languages, and obtain at least one candidate speech recognition result for each language.

The word lattice acquisition module 402b is configured to acquire a word lattice corresponding to each language based on at least one candidate speech recognition result.

The path searching module 403b is configured to perform path searching in the word lattice corresponding to each language, and use the text sequence corresponding to the optimal path as the first speech recognition result.

The word lattice acquisition module is configured to: acquire the start time interval and the end time interval of the text unit in the at least one candidate speech recognition result, and acquire the longest common subsequence corresponding to the at least one candidate speech recognition result; and acquire the word lattice corresponding to each language based on the start time interval and the end time interval of the text unit, as well as the longest common subsequence.

The path searching module is configured to: acquire the sequence of text units based on the start time interval and the end time interval of the text unit in the word lattice corresponding to each language; perform path searching based on the sequence to obtain the first path set; and skip any text unit in the first path by a preset number of text units and connect with a next text unit to obtain a second path set.

Figure 6C:
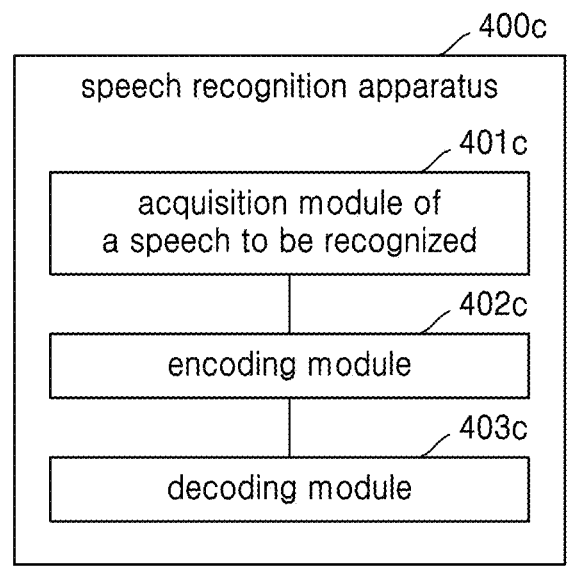
FIG. 6C is a block diagram of a speech recognition apparatus according to yet another embodiment.

FIG. 6C is a block diagram of structure of a speech recognition apparatus according to an embodiment. As shown in FIG. 6C, the apparatus 400c may include an acquisition module of speech to be recognized 401c, an encoding module 402c, and a decoding module 403c.

The acquisition module of speech to be recognized 401c is configured to acquire the speech to be recognized containing at least two languages.

The encoding module 402c is configured to perform encoding respectively for each language to obtain corresponding speech features.

The decoding module 403c is configured to decode based on the speech feature corresponding to each language respectively and a text information features of the speech to be recognized speech to obtain a first speech recognition result of the speech to be recognized.

The decoding module is further configured to: obtain the second decoding feature of the speech to be recognized based on the each first decoding feature acquisition and the corresponding weight coefficient; acquire the language classification feature of the speech to be recognized based on the second decoding feature; and concatenate the second decoding feature and the language classification feature, and acquire the first speech recognition result based on the concatenating result.

The decoding module is further includes: a first speech recognition result acquisition module for acquiring the first speech recognition result of the speech to be recognized; an information acquisition module for acquiring the context information and pronunciation feature information of the target text unit in the first speech recognition result; a second speech recognition result acquisition module for acquiring the second speech recognition result of the speech to be recognized based on the context information and the pronunciation feature information.

Figure 7:
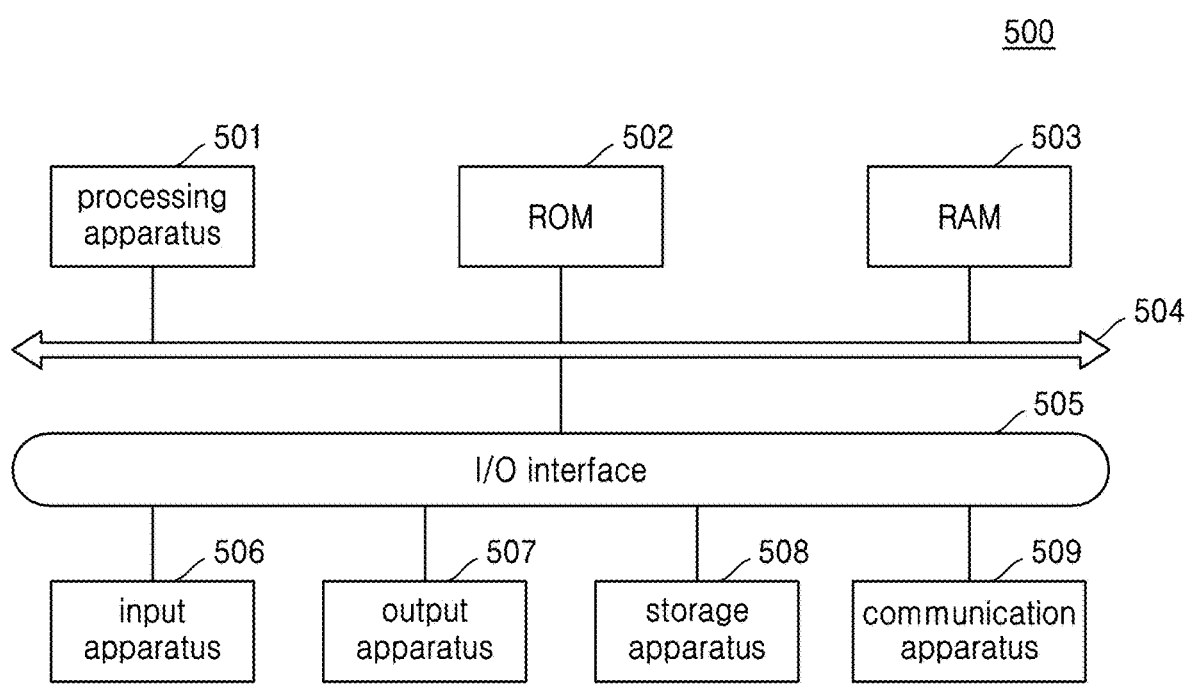
FIG. 7 is a schematic diagram of an electronic device according to an embodiment.

FIG. 7 is a schematic diagram of an electronic device 500 (for example, a terminal device or a server that executes the method shown in FIG. 1) that is suitable for implementing the embodiments of the present disclosure. The electronic device 500 may include, but are not limited to, mobile phones, notebook computers, digital broadcast receivers, PDAs (personal digital assistants), PADs (tablet computers), PMPs (portable multimedia players), vehicle-mounted terminals (for example, Car navigation terminals), mobile terminals such as wearable devices etc., and fixed terminals such as digital TVs, desktop computers, etc. The electronic device shown in FIG. 7 is only an example, and should not construed as being limited the parts and components shown in FIG. 7.

The electronic device includes: a memory and a processor. The memory is used to store programs for executing the methods described in the abovementioned each method embodiment; the processor is configured to execute the programs stored in the memory. Wherein, the processor here may be referred to as the processing apparatus 501 described below, and the memory may include at least one of a read-only memory (ROM) 502, a random access memory (RAM) 503, and a storage device 508 below, specifically as follows:

As shown in FIG. 7, the electronic device 500 may include a processing apparatus 501 (such as a central processor, a graphics processor, etc.), which may execute various appropriate actions and processing according to a program stored in a read-only memory (ROM) 502 or a program loaded into a random access memory (RAM) 503 from a storage device 508. In the RAM 503, various programs and data required for the operation of the electronic device 500 are also stored. The processing apparatus 501, the ROM 502, and the RAM 503 are connected to each other through a bus 504. An input/output (I/O) interface 505 is also connected to the bus 504.

The following apparatus may be connected to the I/O interface 505: input apparatus 506 such as a touch screen, a touch pad, a keyboard, a mouse, a camera, a microphone, an accelerometer, a gyroscope, etc.; an output device 507 such as liquid crystal display (LCD), speakers, vibrator etc.; a storage apparatus 508 such as a magnetic tape, a hard disk, etc.; and a communication apparatus 509. The communication apparatus 509 may allow the electronic device 500 to perform wireless or wired communication with other devices to exchange data. Although FIG. 7 shows an electronic device with various apparatus, it should be understood that it is not required to implement or have all of the shown apparatus. It may be implemented alternatively or provided with more or fewer apparatus.

In particular, according to the embodiments, the process described above with reference to the flowchart may be implemented as a computer software program. For example, the embodiments include a computer program product, which includes a computer program carried on a non-transitory computer readable medium, and the computer program contains program code for executing the method shown in the flowchart. In such an embodiment, the computer program may be downloaded and installed from the network through the communication apparatus 509, or installed from the storage apparatus 508, or installed from the ROM 502. When the computer program is executed by the processing apparatus 501, it executes the above-mentioned functions described in the method according to the embodiments.

It should be noted that the above-mentioned computer-readable storage medium may be a computer-readable signal medium or a computer-readable storage medium or any combination of the above-mentioned both. The computer-readable storage medium may be, but not limited to, an electrical, magnetic, optical, electromagnetic, infrared, or semiconductor system, apparatus, or device, or any combination of the above. More specific examples of computer-readable storage media may include, but are not limited to: electrical connections with one or more wires, portable computer disks, hard disks, random access memory (RAM), read-only memory (ROM), erasable Programmable read-only memory (EPROM or flash memory), optical fiber, portable compact disk read-only memory (CD-ROM), optical storage device, magnetic storage device, or any suitable combination of the above. In the present application, the computer-readable storage medium may be any tangible medium that contains or stores a program, and the program may be used by or in combination with an instruction execution system, apparatus, or device. In the disclosure, the computer-readable signal medium may include a data signal propagated in baseband or as a part of a carrier wave, and computer-readable program code is carried therein. This propagated data signal may take many forms, including but not limited to electromagnetic signals, optical signals, or any suitable combination of the above. The computer-readable signal medium may also be any computer-readable medium other than the computer-readable storage medium. The computer-readable signal medium may send, propagate, or transmit the program for use by or in combination with the instruction execution system, apparatus, or device. The program code contained on the computer-readable medium may be transmitted by using any suitable medium, including but not limited to: wire, optical cable, RF (Radio Frequency), etc., or any suitable combination of the above.

In some embodiments, the client and server may communicate by using any currently known or future-developed network protocols such as HTTP (HyperText Transfer Protocol), and may interconnected with digital data communication (for example, communication network) in any form or medium. Examples of communication networks include local area networks ("LAN"), wide area networks ("WAN"), the Internet network (for example, the Internet), and end-to-end networks (for example, ad hoc end-to-end networks), as well as any currently known or future-developed networks.

The computer-readable medium may be included in the electronic device; or it may exist alone without being assembled into the electronic device.

The computer-readable medium may store one or more programs, and when the one or more programs are executed by the electronic device, the electronic device may be configured to: acquire the first speech recognition result of the speech to be recognized; acquire the context information and the pronunciation feature information of the target text unit in the first speech recognition result; acquire the second speech recognition result of the speech to be recognized based on the context information and the pronunciation feature information; or, acquire a speech to be recognized containing at least two languages, and acquire at least one candidate speech recognition result for each language; acquire a word lattice corresponding to each language based on at least one candidate speech recognition result; perform path searching in the word lattice corresponding to each language, and use the text sequence corresponding to the optimal path as the first speech recognition result; or, obtain the speech to be recognized containing at least two languages; encode respectively for each language to obtain the corresponding speech feature; decode based on a speech feature corresponding to each language respectively and a text information feature of the speech to be recognized to obtain a first speech recognition result of the speech to be recognized.

The computer program code used to perform the operations of the present application may be written in one or more programming languages or a combination thereof. The programming languages include, but are not limited to, object-oriented programming languages such as Java, Smalltalk, C++, and also including conventional procedural programming languages-such as "C" language or similar programming languages. The program code may be executed entirely on the user's computer, executed partly on the user's computer, executed as an independent software package, executed partly on the user's computer and partly on a remote computer, or entirely executed on the remote computer or server. In the case of involving a remote computer, the remote computer may be connected to the user's computer through any kind of network, including a local area network (LAN) or a wide area network (WAN), or may be connected to an external computer (for example, using the Internet service provider to connect through the Internet).

The flowcharts and block diagrams in the drawings illustrate the architecture, functions, and operations of the possible implementation of the system, method, and computer program product according to various embodiments of the present disclosure. In this regard, each block in the flowchart or block diagram may represent a module, program segment, or part of code, and the module, program segment, or part of code contains one or more executable instructions for realizing the specified logic function. It should also be noted that, in some alternative implementations, the functions marked in the block may also occur in a different order from the order marked in the drawings. For example, two blocks shown in succession may actually be executed substantially in parallel, and they may sometimes be executed in the reverse order, which depends on the functions involved. It should also be noted that each block in the block diagram and/or flowchart, and the combination of the blocks in the block diagram and/or flowchart, may be implemented by a dedicated hardware-based system that performs the specified functions or operations, or may be implemented by a combination of dedicated hardware and computer instructions.

The modules or units involved in the embodiments described may be implemented by way of software, may also be implemented by way of hardware. The name of the module or unit does not constitute a limitation on the unit itself in certain case. For example, the first constraint acquisition module may also be described as "a module for acquiring the first constraint".

The functions described hereinabove may be performed at least in part by one or more hardware logic components. For example, without limitation, exemplary types of hardware logic components that may be used include: Field Programmable Gate Array (FPGA), Application Specific Integrated Circuit (ASIC), Application Specific Standard Product (ASSP), System on Chip (SOC), Complex Programmable Logical device (CPLD) and so on.

In the context of the disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above. More specific examples of machine-readable storage media would include electrical connections based on one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the above.

The device provided in the embodiment of the disclosure may implement at least one of the plurality of modules through an AI model. The functions associated with AI may be performed through a non-volatile memory, a volatile memory, and a processor.

The processor may include one or more processors. Meanwhile, the one or more processors may be general-purpose processors, such as a central processing unit (CPU), an application processor (AP), etc., or a pure graphics processing unit, such as a graphics processing unit (GPU), visual processing unit (VPU), and/or AI dedicated processor, such as neural processing unit (NPU).

The one or more processors control the processing of input data according to predefined operating rules or artificial intelligence (AI) models stored in non-volatile memory and volatile memory. The pre-defined operating rules or artificial intelligence models are provided by training or learning.

Here, providing by learning refers to obtaining a pre-defined operation rule or an AI model with desired characteristics by applying a learning algorithm to a plurality of learning data. This learning may be performed in the device itself in which the AI according to the embodiment is executed, and/or may be implemented by a separate server/system.

The AI model may contain a plurality of neural network layers. Each layer has a plurality of weight values, and the calculation of one layer is performed by the calculation result of the previous layer and a plurality of weights of the current layer. Examples of neural networks include, but are not limited to, convolutional neural networks (CNN), deep neural networks (DNN), recurrent neural networks (RNN), restricted Boltzmann machines (RBM), deep belief networks (DBN), bidirectional loops Deep Neural Network (BRDNN), Generative Adversarial Network (GAN), and Deep Q Network.

A learning algorithm is a method of training a predetermined target apparatus (for example, a robot) using a plurality of learning data to make, allow, or control the target apparatus to make determination or prediction. Examples of the learning algorithm include, but are not limited to, supervised learning, unsupervised learning, semi-supervised learning, or reinforcement learning.

Those skilled in the art may clearly understand that for the convenience and conciseness of the description, the specific method implemented when the computer-readable medium described above is executed by the electronic device may refer to the corresponding process in the aforementioned method embodiments, which will no longer be repeated here.

It should be understood that, although the each step in the flowchart of the drawings is displayed in sequence as indicated by the arrows, these steps are not necessarily performed in sequence in the order indicated by the arrows. Unless explicitly stated otherwise, the execution of these steps is not strictly limited in order, and may be executed in other orders. Moreover, at least part of the steps in the flowchart of the drawings may include a plurality of sub-steps or a plurality of stages. These sub-steps or stages are not necessarily executed at the same time, but may be executed at different times, and the order of execution is also not necessarily performed in sequence, but may be performed by turn or alternately with other steps or at least part of sub-steps or stages of other steps.

The above-mentioned embodiments are only a part of the embodiments of the present disclosure. It should be understood that a person of ordinary skill in the art may make improvements and modifications without departing from the principle of the inventive concept of the disclosure, and these improvements and modifications should also be regarded as the protection scope of the present disclosure.

What is claimed is:

1. A speech recognition method, the method comprising:
generating a first speech recognition result of a speech;
acquiring perplexities of a plurality of text units in the first speech recognition result;
selecting a target text unit from among the plurality of text units based on the perplexities;
based on determining that a perplexity of the target text unit is not less than a first preset threshold, acquiring context mask information and pronunciation feature information about the target text unit;
generating a fused phoneme-context fusion vector by fusing the context mask information and the pronunciation feature information using an artificial intelligence (AI) model, wherein the fused phoneme-context fusion vector is a vector that pays attention to a pronunciation content, and wherein the context mask information and the pronunciation feature information are inputs to the AI model;
decoding the fused phoneme-context fusion vector using a partial decoding process to obtain a predicted text corresponding to the target text unit; and
generating a second speech recognition result of the speech based on the predicted text.

2. The method according to claim 1, wherein the selecting the target text unit based on the perplexities comprises:
selecting a first text unit among the plurality of text units having a perplexity not less than the first preset threshold as the target text unit; or
acquiring a second text unit among the plurality of text units based on the first text unit and at least one text unit before or after the first text unit, and selecting the second text unit as the target text unit.

3. The method according to claim 1, wherein the acquiring the context mask information of the target text unit in the first speech recognition result comprises:
replacing the target text unit in the first speech recognition result with a preset mask to obtain an input text sequence; and
acquiring the context mask information corresponding to the target text unit based on the input text sequence.

4. The method according to claim 1, wherein the acquiring the pronunciation feature information of the target text unit in the first speech recognition result comprises:
acquiring a first phoneme set of the target text unit; and
acquiring the pronunciation feature information about the target text unit based on the first phoneme set.

5. The method according to claim 4, wherein the acquiring the pronunciation feature information of the target text unit based on the first phoneme set comprises:
obtaining phonemes in the first phoneme set as the pronunciation feature information about the target text unit; or
replacing at least one phoneme in the first phoneme set to obtain a second phoneme set, and using phonemes in the second phoneme set as the pronunciation feature information about the target text unit.

6. The method according to claim 5, wherein the replacing the at least one phoneme in the first phoneme set to obtain the second phoneme set comprises:

based on a preset rule, acquiring at least one candidate replacement phoneme of the phonemes in the first phoneme set and a probability that the at least one candidate replacement phoneme is used as a replacement phoneme of a corresponding phoneme in the first phoneme set; and replacing the corresponding phoneme with the at least one candidate replacement phoneme having the probability not less than a second preset threshold.

7. The method according to claim 1, wherein the acquiring the second speech recognition result of the speech based on the context mask information and the pronunciation feature information comprises:

replacing the target text unit in the first speech recognition result with the predicted text to generate the second speech recognition result.

8. The method according to claim 7, wherein the generating the fused phoneme-context fusion vector comprises:

based on a multi-head co-attention mechanism network, using the pronunciation feature information as a query, and using the context mask information as a key and a value, fusing the pronunciation feature information with the context mask information to obtain the fused phoneme-context fusion vector.

9. The method according to claim 1, wherein the decoding the fused phoneme-context fusion vector to obtain the predicted text of the target text unit comprises:

for a current target text unit among the plurality of text units, decoding the fused phoneme-context fusion vector based on the predicted text of a previous target text unit among the plurality of text units to obtain the predicted text of the current target text unit.

10. The method according to claim 1, wherein the acquiring the first speech recognition result of the speech comprises:

acquiring the speech in at least two languages, and acquiring at least one candidate speech recognition result for each language of the at least two languages;

acquiring a word lattice corresponding to the each language based on the at least one candidate speech recognition result; and performing a path searching in the word lattice corresponding to the each language, and using a text sequence corresponding to an optimal path as the first speech recognition result.

11. The method according to claim 10, wherein the acquiring the word lattice corresponding to the each language based on the at least one candidate speech recognition result comprises:

acquiring a start time interval and an end time interval of a text unit in the at least one candidate speech recognition result, and acquiring a longest common subsequence corresponding to the at least one candidate speech recognition result; and acquiring the word lattice corresponding to the each language, based on the start time interval, the end time interval of the text unit, and the longest common subsequence.

12. The method according to claim 11, wherein the performing the path searching in the word lattice corresponding to the each language comprises:

acquiring a sequence of the plurality of text units based on the start time interval and the end time interval of each of the plurality of text units in the word lattice corresponding to the each language;

performing the path searching based on the sequence of the plurality of text units to obtain a first path set; and skipping any one of the plurality of text units in the first path set by a preset number of text units and connecting with a next text unit among the plurality of text units to obtain a second path set.

13. The method according to claim 1, wherein the acquiring the first speech recognition result of the speech comprises:

acquiring the speech in at least two languages;

performing encoding respectively for each language of the at least two languages to obtain a speech feature; and performing decoding based on the speech feature corresponding to the each language respectively and a text information feature of the speech, to obtain the first speech recognition result of the speech.

14. The method according to claim 13, wherein the performing the decoding based on the speech feature corresponding to the each language respectively and the text information feature of the speech to obtain the first speech recognition result of the speech comprises:

based on a multi-head co-attention mechanism network, using the text information feature as a query, using the speech feature corresponding to the each language as a key and a value, and acquiring a first decoding feature corresponding to the each language;

performing a linear classification on the first decoding feature to obtain a weight coefficient of the first decoding feature; and acquiring the first speech recognition result based on the first decoding feature and the weight coefficient.

15. The method according to claim 14, wherein the acquiring the first speech recognition result based on the first decoding feature and the weight coefficient comprises:

acquiring a second decoding feature of the speech based on each of the first decoding feature and the weight coefficient;

acquiring a language classification feature of the speech based on the second decoding feature; and concatenating the second decoding feature and the language classification feature, and acquiring the first speech recognition result based on a concatenating result.

16. The method of claim 1, wherein the AI model comprises a multi-head co-attention mechanism network which uses the pronunciation feature information as a query, and uses the context mask information as a key and a value.

17. A speech recognition apparatus comprising:

at least one processor configured to:

generate a first speech recognition result of a speech;

acquire perplexities of a plurality of text units in the first speech recognition result;

select a target text unit from among the plurality of text units based on the perplexities;

acquire context mask information and pronunciation feature information about the target text unit;

based on determining that a perplexity of the target text unit is not less than a first preset threshold, generate a fused phoneme-context fusion vector by fusing the context mask information and the pronunciation feature information an artificial intelligence (AI) model, wherein the fused phoneme-context fusion vector is a vector that pays attention to a pronunciation content, and wherein the context mask information and the pronunciation feature information are inputs to the AI model;

decode the fused phoneme-context fusion vector using a partial decoding process to obtain a predicted text corresponding to the target text unit; and acquire a second speech recognition result of the speech based on the fused phoneme-context fusion vector.

18. A non-transitory computer-readable storage medium storing a computer program which, when executed by a processor, causes the processor to:

generate a first speech recognition result of a speech;

acquire perplexities of a plurality of text units in the first speech recognition result;

select a target text unit from among the plurality of text units based on the perplexities;

based on determining that a perplexity of the target text unit is not less than a first preset threshold, acquire context mask information and pronunciation feature information about the target text unit;

generate a fused phoneme-context fusion vector by fusing the context mask information and the pronunciation feature information using an AI model, wherein the fused phoneme-context fusion vector is a vector that pays attention to a pronunciation content, and wherein the context mask information and the pronunciation feature information are inputs to the AI model;

decode the fused phoneme-context fusion vector using a partial decoding process to obtain a predicted text corresponding to the target text unit; and generate a second speech recognition result of the speech based on the fused phoneme-context fusion vector.

* * * * *